United States Patent [19]

Cates et al.

[11] Patent Number: 5,328,517
[45] Date of Patent: Jul. 12, 1994

[54] METHOD AND SYSTEM FOR REMOVING A COATING FROM A SUBSTRATE USING RADIANT ENERGY AND A PARTICLE STREAM

[75] Inventors: Michael C. Cates, Solana Beach; Richard R. Hamm, San Diego, both of Calif.; Michael W. Lewis, Wichita, Kans.; Wayne N. Schmitz, St. Louis, Mo.

[73] Assignees: McDonnell Douglas Corporation, St. Louis, Mo.; Maxwell Laboratories, Inc., San Diego, Calif.; Cold Jet, Inc., Loveland, Ohio

[21] Appl. No.: 813,872

[22] Filed: Dec. 24, 1991

[51] Int. Cl.$^5$ ................................................ B08B 7/00
[52] U.S. Cl. ........................................... 134/7; 134/1
[58] Field of Search .......................................... 134/1, 7

[56] References Cited

U.S. PATENT DOCUMENTS

| | | | |
|---|---|---|---|
| 3,700,850 | 10/1972 | Lumley et al. | 219/121 |
| 3,986,391 | 10/1976 | Vahaviolos | 73/88 |
| 4,249,956 | 2/1981 | Hartman | 134/7 |
| 4,398,961 | 8/1983 | Mason | 134/19 |
| 4,419,562 | 12/1983 | Jon et al. | 219/130 |
| 4,491,484 | 1/1985 | Williams | 134/4 |
| 4,504,727 | 3/1985 | Melcher et al. | 219/121 |
| 4,543,486 | 9/1985 | Rose | 250/492 |
| 4,588,885 | 5/1986 | Lovoi et al. | 250/226 |
| 4,631,250 | 12/1986 | Hayashi | 134/7 |
| 4,655,847 | 4/1987 | Ichinoseki et al. | 134/7 |
| 4,682,594 | 7/1987 | Mok | 128/303 |
| 4,693,756 | 9/1987 | Schlick | 134/7 |
| 4,718,974 | 1/1988 | Minaee | 156/643 |
| 4,731,125 | 3/1988 | Carr | 134/17 |
| 4,737,628 | 4/1988 | Lovoi | 250/226 |
| 4,803,021 | 2/1989 | Werth et al. | 264/25 |
| 4,836,858 | 6/1989 | Reinhart | 134/1 |
| 4,867,796 | 9/1989 | Asmus et al. | 131/1 |
| 4,994,639 | 2/1991 | Dickinson et al. | 219/121 |
| 5,013,366 | 5/1991 | Jackson et al. | 134/1 |
| 5,024,968 | 6/1991 | Engelsberg | 437/173 |
| 5,062,898 | 11/1991 | McDermott et al. | 134/7 |
| 5,065,630 | 11/1991 | Hadcock et al. | 73/802 |

OTHER PUBLICATIONS

IBM Tech. Disc. Bull., vol. 24, No. 9 Feb. 1982.
Appl. Phys., Dec. 1982, pp. 1043-1044.
Schmitz, Xenon Flashlamp . . . , 6 pp., Apr. 30–May 2, 1991.
Michael C. Cates, Modeling of the Flashblast . . . , 13 pp.

*Primary Examiner*—Asok Pal
*Attorney, Agent, or Firm*—Armstrong, Teasdale, Schlafly & Davis

[57] ABSTRACT

A method is provided for removing material from a structure having at least one layer of material formed on a substrate. The method includes the steps of irradiating a target area of a structure with radiant energy sufficient to break or weaken chemical bonds in the material, and impinging the target area with a particle stream to remove the pyrolyzed material from the structure. The method may be implemented by a system comprising a housing having a window; a radiant energy source mounted in the housing for irradiating the target area of the structure with the radiant energy; and a nozzle mounted to the exterior of the housing for directing the stream of particles at the target area.

61 Claims, 10 Drawing Sheets ical to a material removal process and system that uses pulsed light to pyrolyze a coating on a substrate and a particle stream to impinge and remove the pyrolyzed coating.

METHOD AND SYSTEM FOR REMOVING A COATING FROM A SUBSTRATE USING RADIANT ENERGY AND A PARTICLE STREAM

The present invention relates to a process and system for removing a coating from a substrate, and more particularly to a material removal process and system that uses pulsed light to pyrolyze a coating on a substrate and a particle stream to impinge and remove the pyrolyzed coating.

BACKGROUND OF THE INVENTION

Coatings play an important-role in today's manufactured products based society. Coatings provide immunity to corrosion, thermal insulation, shielding, enhanced appearance, as well as aid in identification. Paints and other types of protective coatings are purposely designed to adhere to the substrate to which they are applied and resist removal. Thus, the removal of paints and other coatings from a substrate is usually very difficult.

During the life of many manufactured products, such as bridges, aircraft, automobiles, and ships, coatings must be removed and replaced for a variety of reasons. For example, refurbishment of the paint on aircraft is a regular maintenance item. Commercial airlines typically repaint their aircraft about every four to five years of service. Coatings on the exterior surfaces of large ships or bridges require periodic refurbishment in order to prevent or inhibit corrosion.

The removal of paint from the surfaces of aircraft presents special problems. Such surfaces are large, irregularly shaped, and relatively delicate. Because the surfaces of aircraft are typically relatively soft aluminum, aluminum alloys, or organic-based composite materials, such surfaces and the underlying substrates are particularly susceptible to damage while undergoing paint removal which could degrade their structural integrity.

Many different methods have been used to remove painted coatings. One method, the "particle medium blast" (PMB) method involves impinging the surface to be stripped with particles such as BB's, plastic media, steel shot, wheat starch, sand, even liquids such as water and frozen particles such as frozen $CO_2$ particles. However, PMB methods sufficiently energetic to remove hardened coatings, such as paint, by themselves may damage delicate surfaces such as found on aircraft and automobiles if they are not carefully managed. For example, if the impinging particles dwell too long at one location, the impinged surface may become pitted or stress hardened. This is especially important with regard to the surfaces of aircraft since pitting or stress hardening may change the mechanical properties of the surface material. High-energy PMB methods may also deform the surface of the substrate sufficiently to mask fatigue cracks and other anomalies which, if undetected and uncorrected, could lead to catastrophic failure of the substrate. PMB may also damage putty joints often found on aircraft between surface plates. Moreover, these processes generate a large amount of particulate waste requiring costly disposal. This waste is contaminated by toxic constituents of the coating, increasing the difficulty and expense of its disposal.

Another method involves the application of chemical agents to painted surfaces in order to chemically break down the layers of paint, thereby stripping the paint away from the surface to be exposed. However, such agents may pose a risk to human health, are usually toxic, and are often not biodegradable. Overall, these types of agents are difficult and costly to dispose of because they present serious environmental problems. Government regulations are increasingly restrictive of the use of such agents.

Still other methods involve the mechanical removal of the coating from the substrate. For example, U.S. Pat. No. 4,836,858, entitled "Ultrasonic Assisted Paint Removal Method" discloses a hand-held tool which uses an ultrasonic reciprocating edge placed in contact with the surface to be stripped. Use of such tools is labor intensive and requires skilled operators. Further, control of this tool is a problem when applied to aircraft because the aircraft surface may be damaged if there is excessive tool dwell at one location.

Still other methods involve the application of radiant energy to the coating. One such system uses a flashlamp pumped laser and video frame grabber in a video controlled paint removal system in which paint is stripped from a surface using the output of the laser to ablate the paint while a video camera converts images of the surface being stripped into electronic data signals. The data signals are used to control the laser output. A processor compares the data signals with parameters stored in a memory to determine whether sufficient paint has been removed from the surface being stripped. If an insufficient amount of paint has been removed, then the laser continues to irradiate the surface. If the surface has been adequately stripped, the processor directs the laser to ablate another area. A significant problem with the video controlled paint removal system is that the amount of data which is generated and which must be processed is enormous, making real time control extremely difficult.

Furthermore, a laser powerful enough to vaporize paint requires high power due, in part, to laser pumping inefficiencies. Employment of such a powerful laser requires a large capital investment in order to provide space to operate the laser, as well as laser stops to prevent the laser beam from inadvertently escaping the work area and even the building where it is being used. Such a laser poses a serious danger to humans, who must be kept out of the area where the laser operates. Another problem with the use of lasers is the occurrence of localized "hot spots" which can damage or destroy the substrate.

Pulsed light, for example from flashlamps, has also been used to ablate coatings from their substrates. A problem with ablating solely with radiant energy is the risk of heat damage to the substrate. Moreover, ablation can result in flame and smoke which can reduce the efficiency of or damage the equipment and which may pose a hazard for personnel. Further, these processes typically leave a non-water soluble carbonized residue that must be removed in a labor-intensive process.

The use of composite structures manufactured, for example, of carbon epoxy or other reinforced plastic materials is becoming increasingly common. Many aircraft and automobiles extensively employ reinforced composite materials, including carbon epoxy materials, for surface structures. Such structures are painted for a variety of reasons including aesthetics, identification, and camouflage. However, such painted surfaces deteriorate under the action of weather and the mechanical forces to which they are subjected, thus requiring removal and replacement.

Other than hand sanding, there have been no suitable methods for removing paint from non-metallic composite surfaces. PMB and mechanical grinding methods sufficiently energetic to remove paint by themselves have proven to damage composite materials. The removal of paint with chemical agents does not offer a satisfactory solution because such chemicals tend to attack the organic binder in the composites, as well as the paint. Some composites are sensitive to high temperatures, such that high temperature methods of removing coatings are not satisfactory.

For a variety of reasons, paint removal techniques for removing paint from large surfaces, and surfaces having topological anomalies such as rivets, have not proven wholly satisfactory. Thus, it can be appreciated that coating removal, and particularly, the removal of paint from large and often delicate surfaces such as found on aircraft and automobiles, is a problem that has not heretofore been satisfactorily solved.

SUMMARY OF THE INVENTION

This invention provides a method of removing material from a structure having at least one layer of material formed on a substrate. Generally, the method comprises irradiating the material sufficiently to weaken the material and its adhesion to the substrate, and impinging the weakened material to remove it from the substrate. This weakening results from the breaking or weakening of the chemical bonds in the material, and between the material and the substrate.

One embodiment of the invention provides a method for removing material from a structure, comprising the steps of: irradiating a target area on the structure with radiant energy sufficient to pyrolyze the material without substantially ablating the material; and impinging the target area with a particle stream to remove the pyrolyzed material from the structure. The method is implemented by a system comprising a housing having a window; a radiant energy source mounted in the housing for irradiating the target area on the structure with the radiant energy; and a nozzle mounted to the exterior of the housing for directing the stream of particles generally at the target area.

Another embodiment of the invention provides a method and system for removing material from a substrate that employs a photodetecting system which detects the optical character of the surface of the structure. Feedback generated by the photodetecting system is analyzed by a digital data processor which generates output signals that control the scan speed of the radiant energy source and particle stream over the structure. A method by which the second embodiment may be implemented includes the steps of: irradiating a target area on the structure with radiant energy sufficient to pyrolyze the material without substantially ablating said material; impinging the pyrolyzed material with a particle stream to remove the pyrolyzed material from said substrate; scanning the surface of the structure with the radiant energy and the particle stream along a predetermined path at a scan speed; detecting the optical character of the surface of the structure along the path; updating the scan speed based upon the detected optical character; and repeating steps of the process if the radiant energy and said particle stream have not scanned the entirety of the predetermined path.

A significant advantage of the invention is that it provides a coating removal technique that is gentle and benign to underlying substrates. The radiant energy is preferably pulsed light that heats the coating, causing it to pyrolyze. Pyrolysis reduces the cohesion of the material to itself and its adhesion to the underlying substrate. The pyrolyzed coating is removed using a relatively low-power particle stream. Because the pyrolyzed material does not adhere well to the surface of the substrate, a relatively low-energy particle stream is able to dislodge the pyrolyzed coating from the substrate. The resulting combination process can be more benign as well as more efficient than either a more energetic pulsed light or particle jet based process alone.

The invention is ideally suited for removing coatings from any substrate, including delicate, thin, or composite substrates. Another advantage of the invention is that it may be economically employed to remove coatings from large areas under the control of a data processor. These and other advantages of the invention will become more readily apparent from the specifications, drawings, and claims.

BRIEF DESCRIPTION OF THE DRAWINGS

Throughout the specification and drawings, like components are referenced using like reference numerals.

DESCRIPTION OF THE PREFERRED EMBODIMENT

While the present invention is being described in terms of preferred embodiments, it is to be understood that the invention is not to be limited to the exact form of the apparatus or processes disclosed. Therefore, it is to be understood that the invention may be practiced other than as specifically described without departing from the scope of the claims.

FIRST EMBODIMENT

The first embodiment of the present invention provides a relatively gentle process and system for removing coatings from a substrate by irradiating the coating with pulsed radiant energy, such as light, sufficient to pyrolyze the coating to weaken the chemical bonds both within the coating and between the coating and the substrate, and then impinging the weakened coating with a low-energy particle stream to physically dislodge the coating from the substrate. Pyrolysis weakens and breaks cohesive bonds in the material and adhesive bonds between the coating and the substrate. The present invention is particularly suited for removing paint from the surfaces of fragile substrates such as plastic, alclad aluminum, aluminum alloys, and composite materials. This embodiment is expected to find wide use in the paint removal industry.

Figure 1:
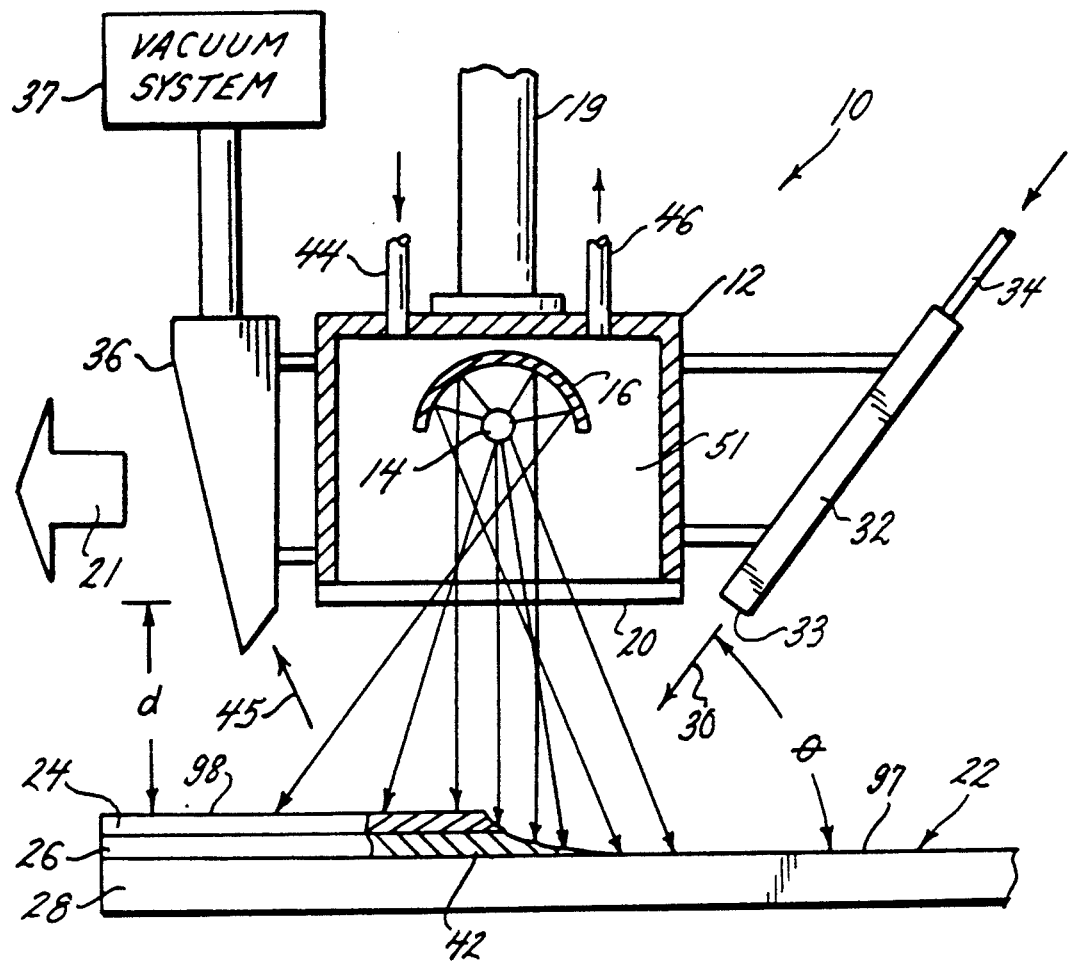
FIG. 1 is a schematic diagram of an a first embodiment of a system embodying various features of the present invention for removing a coating from a substrate by pyrolyzing and blasting the coating from the surface of the substrate.

Referring to FIG. 1, there is shown a system 10 particularly adapted for implementing the present invention. The system 10 includes a housing 12 in which is mounted a radiant energy source such as optical energy source 14 and reflector 16 such that optical energy generated by the source 14 is directed and/or reflected off of the reflector 16 through a window 20 so as to irradiate a target area 91.(see FIG. 5) on the surface of a structure 22. The structure 22 is comprised of a substrate 28 on which is formed, by way of example, layers 26 and 24. Although structure 22 may include any number of layers, for purposes of illustration the structure 22 is described herein as having two layers formed on the substrate. The optical energy source 14 and reflector 16 are preferably cooled by deionized water provided from a water supply (not shown) to the interior 51 of the housing 12 through an inlet tube 44 and returned through an outlet tube 46.

In this first preferred embodiment, the optical energy source 14 may be a broadband flashlamp. A flashlamp, or flashtube, is a gas-filled device which converts electrical energy to optical energy by passing current through a plasma typically contained in a transparent tube through which the optical energy is transmitted. A broadband flashlamp generates optical energy having wavelengths which may range from 170-5000 nm. A broadband flashlamp provides electromagnetic energy over a broad spectrum, increasing the likelihood of absorption by the various components of the coating. A flashlamp offers the further advantage of being readily adaptable for irradiating relatively large areas.

The housing 12 is supported by manipulator 19 which may be controlled to move housing 12 over the surface of structure 22 at a standoff distance, d, in order to irradiate and scan the structure with optical energy generated by optical energy source 14. The standoff distance d represents the perpendicular distance between window 20 and the top surface of structure 22. The manipulator 19, may for example, be a CIMROC 4000 Robot Controller manufactured by CIMCORP Precision systems, Inc., Shoreview, Minn.

The intensity of light energy incident on structure 22 must be sufficient so that the light absorbed by the layers 24 and 26 heats these layers sufficiently to weaken and/or break the chemical bonds in the molecules of the material comprising the layers 24 and 26 in a process referred to as pyrolysis. The breakdown of the material weakens the adhesion of the material to itself and to the substrate, facilitating the removal of the material. The depth of heating resulting from a single light pulse is a function of the intensity and pulse width of the optical energy source 14, the stand-off distance of the optical energy source, the scan rate of the optical energy source across the surface of the structure, the thickness of the layers, and the thermal characteristics of the materials comprising the layers. A major advantage of the invention is that the process can be controlled, by controlling the depth of heating as explained more fully herein, so that layers 24 and 26 may be removed from the surface of substrate 28 without subjecting the substrate to excessive, potentially damaging, heat build-up. Damage would be evidenced by permanent changes in the shape or in the mechanical properties of the substrate, such as the modulus of elasticity, shear strength, and tensile strength. Such changes in the shape or in the mechanical properties of the substrate are undesirable.

A particle stream 30 is ejected from nozzle 32 and directed to impinge the pyrolyzed portions of layers 24 and 26 so as to dislodge the pyrolyzed portions 42 of the layers 24 and 26 from the substrate 28. The particle stream 30 is provided to nozzle 32 via duct 34 from a particle supply, not shown. The particle stream 30 may be composed of gases, liquids, or solids, as for example, inert gas, dry air, water, water droplets, carbon dioxide gas, carbon dioxide pellets, walnut shells, and the like, or any combination of gas, liquid, or solids entrained in gas or liquid or solid. Most preferably the particles comprise particles of a frozen gas, such as $CO_2$ or Ar. In some applications, it may be desirable to heat any such gas to prevent any moisture from the surrounding atmosphere from condensing on the surface of structure 22 in the area impinged by the particle stream if the temperature of the surface would otherwise drop below the dew point. It may also be desirable for particle stream 30 to have a temperature well below ambient temperature in order to control the temperature of the pyrolyzed material on the substrate 28, so that the substrate 28 does not sustain heat damage, yet the material remains in a pyrolyzed state.

A low kinetic energy particle stream of frozen carbon dioxide pellets entrained in a dry, high pressure transport gas have been found particularly suitable for removing paint and primer from aluminum and organic composite surfaces of aircraft. Frozen $CO_2$ particles are particularly desirable because they impart kinetic energy to the coating, and they also function to keep the substrate cool, so that it is not damaged by the high temperatures generated by the flash lamp. It is believed that maintaining a temperature differential between the substrate and the coating enhances removal. The $CO_2$ also helps to cool and clean the window of the flashlamp or other radiant energy source. It is believed that the frozen $CO_2$ sublimes upon or shortly after impact with the coating and, therefore, is instantly separated from the material that has been removed from the substrate. Thus, the volume of waste that must be disposed of is greatly reduced over other particle blasting systems. Moreover, the resulting $CO_2$ gas creates a fire and explosion resistant environment around the removal site, and also suppresses deleterious smoke and soot. An example of a suitable device for providing the frozen $CO_2$ particles is the Model 65-200 unit available from Cold Jet, Inc., Cincinnati, Ohio. The device is capable of providing frozen $CO_2$ in particles with diameters ranging from 0.080 in. to 0.140 in., with transport gas pressures of from 50 psig to 350 psig, and mass flow rates from 0 to 1500 lbs/hr. Suitable equipment for creating and delivering particle streams is disclosed in U.S. Pat. Nos. 4,947,592, 4,744,181, 4,843,770, 5,056,805, 5,018,667, and 5,063,015, incorporated herein by reference.

The nozzle 32 is mounted to the housing 12 so that as the housing is translated across the structure 22, the optical energy source 14 scans different target areas on structure 22, with the nozzle 32 following. Thus, the material on the structure 22 is subjected to a continuous process whereby the optical energy source 14 scans the structure 22 to irradiate and pyrolyze selected target areas on the structure while the particle stream 30 removes the pyrolyzed material.

Figure 5:
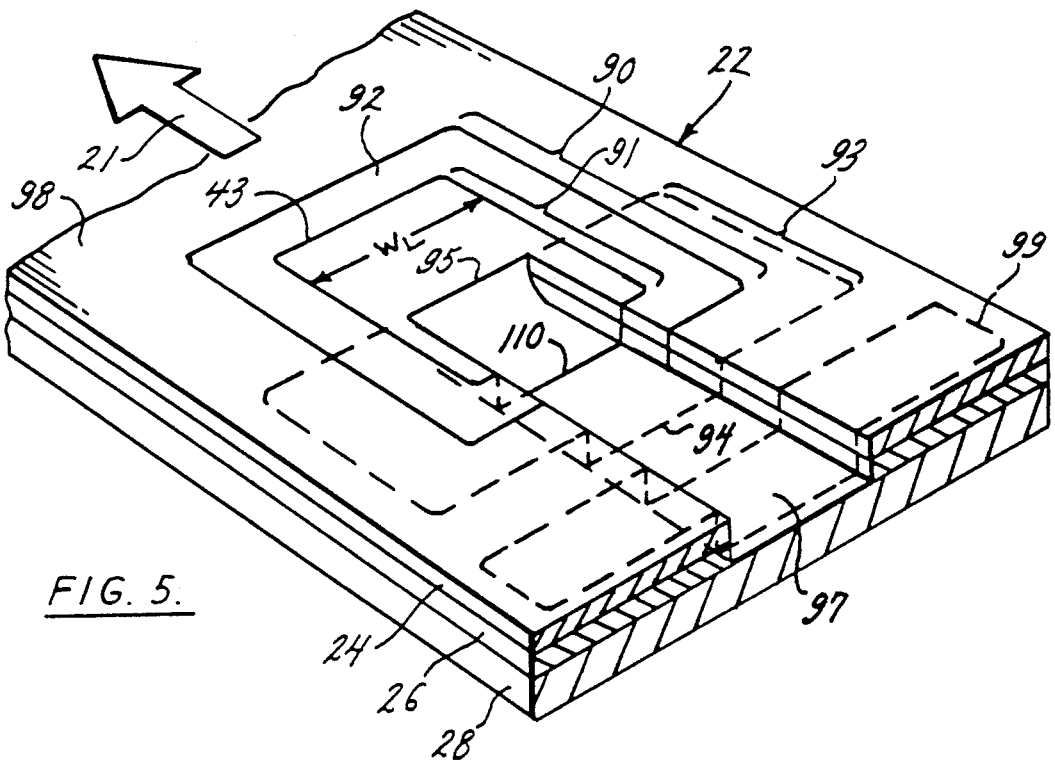
FIG. 5 illustrates the target area of the light source and the footprint of the particle stream on the surface of the structure.

Referring now to FIG. 5, light energy directed on the surface 98 of structure 22 results in an illuminated area 90 on the structure. Area 90 includes the focus or "target" area 91, having a width $W_L$ that is subjected to the more intense irradiation and is surrounded by penumbra area 92 which is subjected to less intense irradiation. As the optical energy source 14 scans across a path on the surface 98 of the structure 22 in the direction of arrow 21, the portions of the layers 24 and 26 subjected to the more intense irradiation in the target area 91 are pyrolyzed. The area 91 has a "leading" edge 43 and a "trailing" edge 110. For purposes of illustration, the area 91 is shown to be substantially rectangular, however, the shape of area 91 depends on the particular configuration of reflector 16, which may be selected to suit the requirements of a specific application.

Figure 6:
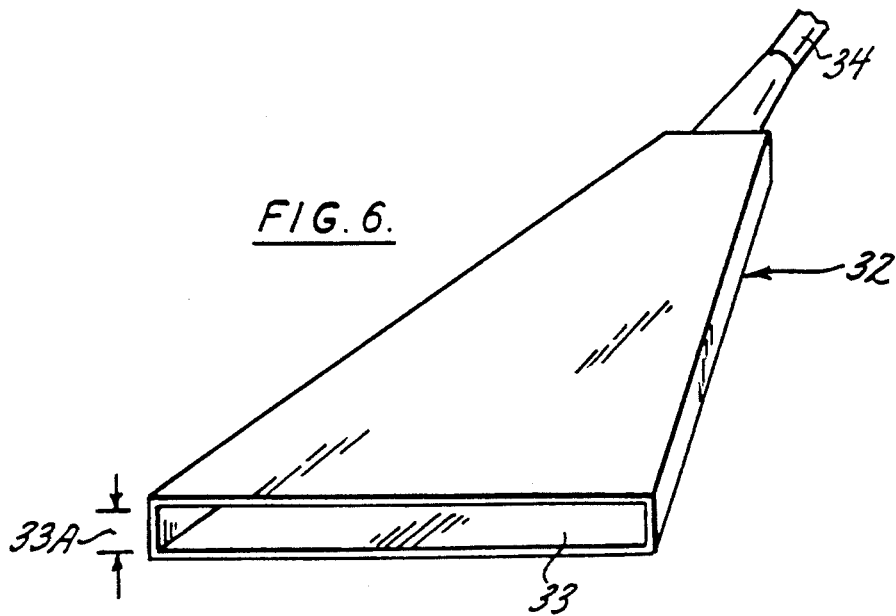
FIG. 6 is a perspective view of the nozzle through which the particle stream is ejected.

As the optical energy source 14 scans the path on the surface 98 of the structure 22, the particle stream 30 (not shown in FIG. 5) impinges and scans the surface 98 in the direction of arrow 21 with a pattern or footprint 93 that is determined by the size and shape of the outlet 33 of nozzle 32, shown in FIG. 6. Preferably, the footprint 93, having a leading edge 95 and a trailing edge 94, overlaps a portion of the target area 91 such that the leading edge 95 of the footprint 93 is just slightly ahead of the trailing edge 110 of the target area 91 in order to assure that particle stream 30 impinges pyrolyzed portions of the layers 24 and 26. In other words, the target area 91 of the optical energy source 14 and the footprint 93 of the particle stream 30 may slightly overlap. In this case the particle stream simultaneously impinges at least a portion of the target area while it is being irradiated with optical energy. However, it is to be understood that the leading edge 95 of the footprint 93 of the particle stream 30 may also impinge behind the pyrolyzed portions of the layers 24 and 26, with no overlap, provided that the portion impinged by the particle stream 30 is in a pyrolyzed state. In this case, the target area is first irradiated by optical energy source 14, and then momentarily later, is impinged by particle stream 30.

The effect of scanning the surface 98 of the structure 22 with optical energy source 14 and particle stream 30 results in removal of segments of layers 24 and 26 to expose some of the surface 97 of the substrate 28. The particle stream 30 removes the coating in layers of a depth generally corresponding to depth of heating caused by the high intensity pulsed light.

Referring to FIG. 1, the shape of the footprint 93 (FIG. 5) is determined by the shape of outlet 33 of nozzle 32 and the angle $\theta$, between the flow axis of nozzle 32 and the surface 98 of the structure 22. The angle of incidence $\theta$ is selected to maximize the removal effect of the particles for a specific application, while minimizing the impact of the particles on the substrate. Moreover at this angle $CO_2$ rebounding from the structure tends to cool and clean the window 20 of the radiant energy source 14, enhancing its efficiency and extending its service life. In an example of the preferred embodiment, the shape of outlet 33 may be an elongated rectangle (as shown in FIG. 5), or oval. If the particle stream 30 is comprised of carbon dioxide pellets entrained in dry air, the thickness 33A of outlet 33 must be sufficient for the pellets to flow through the outlet 33 so that the outlet does not clog from any condensing moisture or from the pellets themselves.

During this process, a vacuum system 37 draws the gases, spent particles, and dislodged pyrolyzed portions of the layers 26 and 24 away from the footprint through nozzle 36. Such vacuum systems are well known in the art.

The amount of radiant energy applied is preferably not great enough to ablate substantial amounts of layers 24 and 26 in the target area. Ablation is a process in which so much energy is applied to the material that in addition to breaking chemical bonds in the material, which forms smaller molecules, the resulting smaller molecules are quickly and violently vaporized from the surface. Although some ablation is to be expected when pyrolyzing organic substances, as typically comprise paints or epoxies, ablation is not the preferred mode of removal. The radiant energy is therefore preferably applied to substantially pyrolyze the material without substantial ablation. Substantial ablation occurs when the majority of the material to be removed is removed from the substrate in an ablation process. This can be accomplished by controlling the amount of energy applied with the radiant energy source and/or by removing some of the energy applied by the radiant energy source with the particle stream. For most materials that will be removed by this process, the intensity of incident light energy will generally be in the range of about 1 to 30 joules/cm$^2$ at a FWHM pulse of about 1500 microseconds. Control of the amount of radiant energy applied to the surface 98 of the structure 22 is easily effected primarily by employing an optical energy source 14 having a suitable output, and secondarily by establishing a suitable standoff distance between the surface of the structure and the source of radiant energy and an appropriate scan rate.

Figure 2:
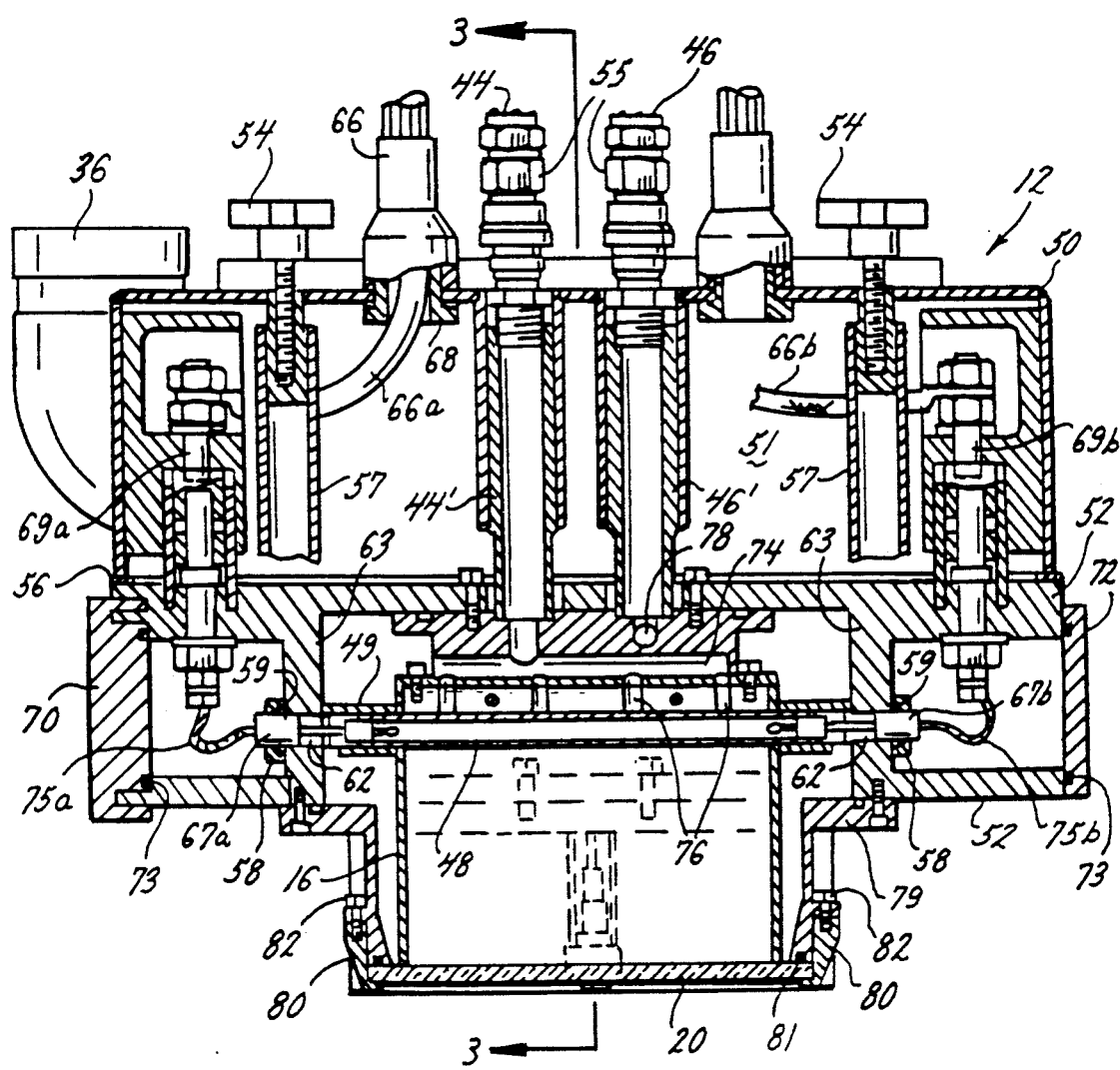
FIG. 2 is a vertical cross-sectional view of the housing in which the light source and reflector are mounted.

FIG. 2 is a vertical transverse cross-sectional view of a system for implementing the method of the first embodiment. As shown in FIG. 2, the housing 12 comprises upper housing member 50 attached to lower housing member 52 with fasteners 54 that extend through the upper housing member 50 and engage stanchions 57 on the lower housing member 52. A sealing gasket 56 is disposed between the upper and lower housing members 50 and 52 to form a sealed chamber 51 in the upper housing member 50. The housing 12 is preferably made from black, hard anodized aluminum.

The lower housing member 52 has depending vertical walls 63. A flashlamp 48 sealed inside a fused quartz water jacket 49 is mounted between opposing walls 63 on the lower housing member. Electrical connectors 67a and 67b at the ends of the flashlamp 48 extend through apertures 62 in the walls 63. The flashlamp 48 is secured by compression fittings 58 that fit over the electrical connectors 67a and 67b, and are secured to the walls 63 by fasteners (not shown). The compression fittings 58 have "O"-rings 59 for making a water tight seal between the ends of the flashlamp 48 and the walls 63.

Figure 3:
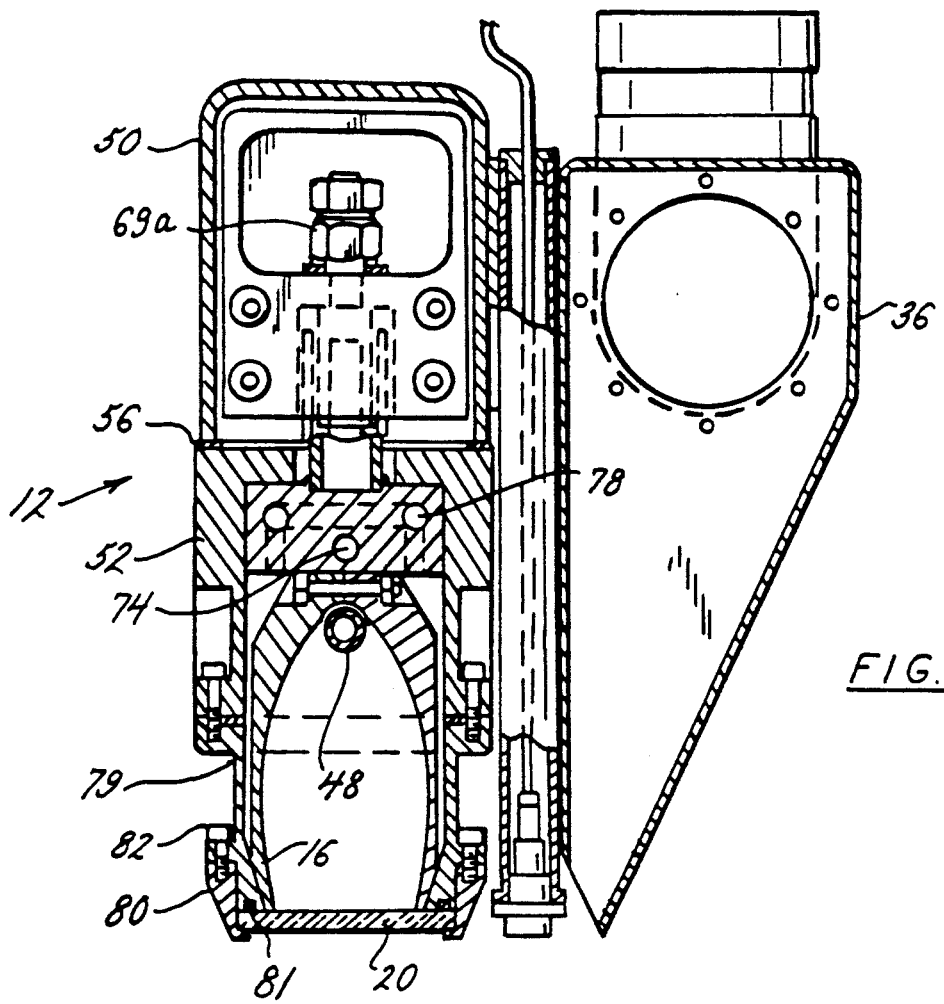
FIG. 3 is a vertical cross-sectional view of the housing taken along the plane of line 3—3 in FIG. 2.

The reflector 16 is disposed around the flashlamp 48. The reflector 16 preferably has an elliptical cross-section, as best shown in FIG. 3, in which case the longitudinal axis of the flashlamp coincides with one of the foci of the reflector 16. For example, the ellipse may have a major axis of 7 cm, a minor axis of 2.8 cm, and a length of about 15 cm. However, the reflector could have some other configuration, for example a parabola, a keyhole, or a cusp.

Electrical power to energize the flashlamp 48 is provided by a high voltage coaxial cable 66 that extends into upper housing member 50 in a cable fitting 68. The cable 66 comprises a central conductor 66a which is connected to the upper end of a first terminal post 69a, and a braided strap 66b which is connected to the upper end of a second terminal post 69b. The lower ends of the terminal posts 69a and 69b extend through the lower housing member 52. A braided cable 75a connects the lower end of the terminal post 69a to the electrical connector 67a of the flashlamp. Similarly, a braided cable 75b connects the lower end of the terminal post 69b to the electrical connector 67b of the flashlamp. These electrical connections are sealed in chambers formed between the lower housing member 52 and covers 70 and 72, respectively. Each of the covers 70 and 72 has a sealing gasket 73, and is secured by some conventional means (not shown).

A collar 79 is secured to the bottom of the lower housing member 52, for example with screws. Window 20 is mounted over the lower end of collar 79, for example with a window frame 80 secured with screws 82. A sealing gasket is disposed between the collar 79 and the window 20 to provide a fluid-tight seal therebetween. The window 20 is preferably made of fused quartz because of its excellent transparency (which does not degrade upon exposure to ultraviolet light) and its high resistance to heat. Light generated by flashlamp 48 is emitted through the quartz water jacket 49, and either passes directly through the window 20, or is reflected off of reflector 16 through the window 20.

The flashlamp 48 and the reflector 16 are preferably cooled by circulating deionized water. For example water at a temperature of about 50° F. provided at a flow rate of about 2 gpm would generally be adequate to cool the flashlamp and reflector. The water is preferably deionized so that it has an electrical resistance greater than about 1 MΩ. The cooling water is provided from a suitable source (not shown) through a supply line 44. The supply line 44 is connected with quick-connect fitting 55 to conduit 44' that extends through the upper housing member 50 to a manifold 74 in the lower housing member 52. The manifold 74 communicates with a plurality of openings or outlets 76 in the reflector 16 so that water is distributed over the length of the flashlamp 48, the quartz jacket 49, and over the reflector 16. Heat generated by the operation of the flashlamp is absorbed by the water, which is circulated out through port 78 into conduit 46', and back to the water supply through return line 46, connected to conduit 46' with a quick-connect fitting 55.

It is well known that in order to maximize the service life of a flashlamp, the operation of the flashlamp should be critically damped, that is, it should be operated with a dampening coefficient of about 0.77. Factors that determine the dampening coefficient of a flashlamp include: inductance of the single mesh pulse forming network ("PFN") typically employed in the flashlamp power circuit, capacitance, C, of the PFN, arc length of the flashlamp, and operating voltage, V, across the terminals of the flashlamp. The energy output, E, of a flashlamp is characterized by the relation $E=\frac{1}{2}CV^2$. However, to maximize service life, V should only be varied by no more than about five per cent of the optimum voltage. Further, it is not practical to vary C because of the expense of additional capacitors required to implement such a circuit and because of the life-limiting character of this type of circuit. Therefore, in order to maximize the useful life of flashlamp 48, the flashlamp is preferably operated at a constant repetition rate and a fixed pulse width.

By way of example only, the flashlamp 48 may include a transparent tube filled with xenon gas at a pressure of 60 KPa, and having an overall length of 28 cm, a 7 mm inside diameter, 9 mm outside diameter, and a 15 cm arc length. Typical pulse lengths for a xenon flash lamp are between 1 μsec and 5 msec. The rate of energy applied per unit area is preferably less than the ablation threshold, i.e., the light applied per unit area per unit time is preferably insufficient to remove the coating by ablation. The energy required by this system for a given coating on a given substrate can be readily empirically determined. Medium level bursts of energy (on the order of 9–12 J/cm$^2$) are typical as compared to the 18–25 J/cm$^2$ required to substantially ablate the coating. This particular flashlamp 48 is preferably operated at a repetition rate of 4–5 Hz, and has a full-width, half-maximum ("FWHM") fixed pulse width of about 1500 microseconds and an input energy of about 100–120 joules/cm of arc length. Although in some circumstances it might be desirable to have a greater repetition rate and a shorter pulse width. As is characteristic, the useful output energy of a flashlamp available to irradiate the surface of structure 22 is approximately 20–25 per cent of the input energy to the flashlamp. The flashlamp is powered by a suitable power supply, not shown, as would be known by those of ordinary skill in the art.

Because the flashlamp 48 is operated with a damping coefficient of about 0.77, the preferred method of controlling the energy flux (joules/unit area) at the surface of structure 22 is to control the distance between the flashlamp and the surface of the structure. The energy intensity incident at the surface of the structure is generally inversely proportional to the square of the distance between the surface and the flashlamp. The distance between the flashlamp and the surface of structure 22 is more conveniently discussed with reference to the standoff distance, d, between the surface of the structure and the window 20, because the distance between the window and the flashlamp is fixed.

The temperature of layers 24 and 26 is a function of the optical energy output of the flashlamp 48 that is absorbed by the layers, the repetition rate of the flashlamp (or of any other radiant energy source), the albedo of the surface layer (dark colored surfaces absorb light better than light colored surfaces); the relative speed (also referred to as the scan rate) of the flashlamp 48 across the surface 98 of the structure 22, the distance between flashlamp 48 and the surface of structure 22, the temperature of particle stream 30, and the mass flow rate of the particle stream. However, as noted above, to maximize the service life of flashlamp 48, the flashlamp is preferably operated at a constant repetition rate. It is generally not practical to vary the temperature of a particular particle stream. Therefore, control of the temperature of layers 24 and 26 is preferably effected by first determining a suitable scan rate, and then an appropriate standoff distance for a particular structure. The temperature may also be controlled by the selection of, and mass flow rate of the particle stream.

In general, a suitable scan speed and standoff distance for a particular structure 22 are determined experimentally. The structure is scanned at an initial trial scan speed using the system and methods described above with reference to FIG. 1. The initial trial scan speed is intentionally selected to be high enough so that at the given intensity of optical energy at the surface of structure 22, an insufficient amount of material from the layers 24 and 26 are removed. The high initial scan speed prevents too much optical energy from being delivered to structure 22 in a given time period. Then, the scan speed is decreased until, at the given incident intensity determined by the standoff distance, sufficient material is removed from the layers 24 and 26 so as to expose the surface of substrate 28 in an undamaged condition. If at the slowest scan speed, layers 24 and 26 are not sufficiently removed from substrate 28, the standoff distance is reduced and a new set of scan speed tests are conducted, as described above. This process is repeated until a combination of scan speed and standoff distance results in exposure of substrate 28 without damage.

For typical applications, the standoff distance is controlled to provide an incident intensity at the surface of structure 22 in the range of 1-30 joules/cm$^2$. If the surface of substrate 28 is damaged, a faster scan speed may be tried. The maximum scan speed is limited by the performance characteristics of the manipulator 19. Typical scan speeds range from about 0.08 cm/sec to about 2.0 cm/sec. If substrate 28 is damaged at the fastest reasonable scan speed of the manipulator 19, then the standoff distance should be increased.

The temperature of layers 24 and 26, as well as the temperature of substrate 28 can also be controlled to some extent by varying the selection of and mass flow rate of the particle stream 30 because the particle stream 30 can absorb heat energy from structure 22. Thus, if it were desirable to lower the temperature at the surface 98 of the substrate 28, whether or not overlying layers 24 or 26 have been removed, the mass flow rate of particle stream 30 may be increased. However, the mass flow rate of the particle stream 30 must not be so great that it damages the surface of substrate 28. Conversely, in some circumstances it may be desirable to increase the temperature of layers 24 and 26 to assure that they are adequately pyrolyzed when they are impinged by particle stream 30. In such case, the mass flow rate of the particle stream 30 may be decreased.

The operation of the present invention will be described with reference to FIG. 1. Initially, the manipulator 19 is positioned so that the standoff distance, d, between window 20 and the surface 98 of the structure 22 is such that the radiant energy flux provided by optical energy at the surface of the structure 22 is sufficient to pyrolyze the coatings to be removed, but insufficient to substantially ablate them. The manipulator 19 is controlled to position the housing 12 such that optical energy source 14 is positioned over the area of the structure 22 from which the layers 24 and 26 are to be removed. Deionized water circulates through housing 12 to cool reflector 16 and optical energy source 14. Then, particle stream 30 is directed to impinge the surface of structure 22, and vacuum system 37 is started. Next, optical energy source 14 is enabled and directed to irradiate the surface 98 of the structure 22, and the scanning of the surface is initiated.

Pulsed optical energy incident on the target area of the surface of structure 22 is absorbed by the material forming layers 24 and 26 and converted to heat, causing layers 24 and 26 to pyrolyze. During this time, the particle stream 30 is directed to impinge the pyrolyzed portions of layers 24 and 26. The kinetic impact of particle stream 30 on the pyrolyzed portions of the layers 24 and 26 causes these portions to be blasted into particles 45, which are dislodged off of the surface of substrate 28.

The vacuum system 37 draws the blasted particles 45 and expended particle stream 30 through nozzle 36 to collect and remove them from the vicinity of the target area 91 at the surface of structure 22. Exposure of additional areas of substrate 28 is accomplished by moving or scanning the housing 12 so that optical energy source 14 scans structure 22 in the direction of arrow 21. Optical energy source 14 is directed to scan structure 22 until the desired area of substrate 28 has been exposed, at which time the system may be shut down.

The process may be controlled in real time by an operator using visual feedback based on observation of the trail of exposed surface 97 of the substrate 28. Such visual feedback may, for example, be provided by direct observation, or by a television system, not shown. In such case, the operator may control manipulator 19 using servos, not shown, so that optical energy source 14 scans structure 22 at a rate sufficient to remove layers 24 and 26. If the operator observes that insufficient material is being removed at a particular region, the scan speed of manipulator 19 may be decreased and/or the standoff distance may be reduced. If manipulator 19 is a computer controlled robotic positioner, optical energy source 14 may be directed to traverse a predetermined path at a speed controlled by a computer, not shown, in accordance with techniques well known by those skilled in the art.

The thermal effects of light energy on structure 22 are graphically presented and described with reference to FIGS. 1 and 4, collectively. As housing 12 moves in the direction of arrow 21, light energy first irradiates the structure 22 below. The light energy is absorbed by layers 24 and 26, and, to some extent, the substrate 28.

Each pulse typically heats a thin layer of the coating to a depth of about 0.25 to about 1 mil. Since paint coatings on an aircraft are typically between 2 and 8 mils thick, and more typically between 6 and 8 mils thick, it takes several pulses or flashes to pyrolyze and remove the entire thickness of the coating. This is achieved by coordinating the scan speed and the pulse rate. The depth of the heating can be fairly well controlled in this fashion, which helps to avoid damage to the substrate 28.

Figure 4:
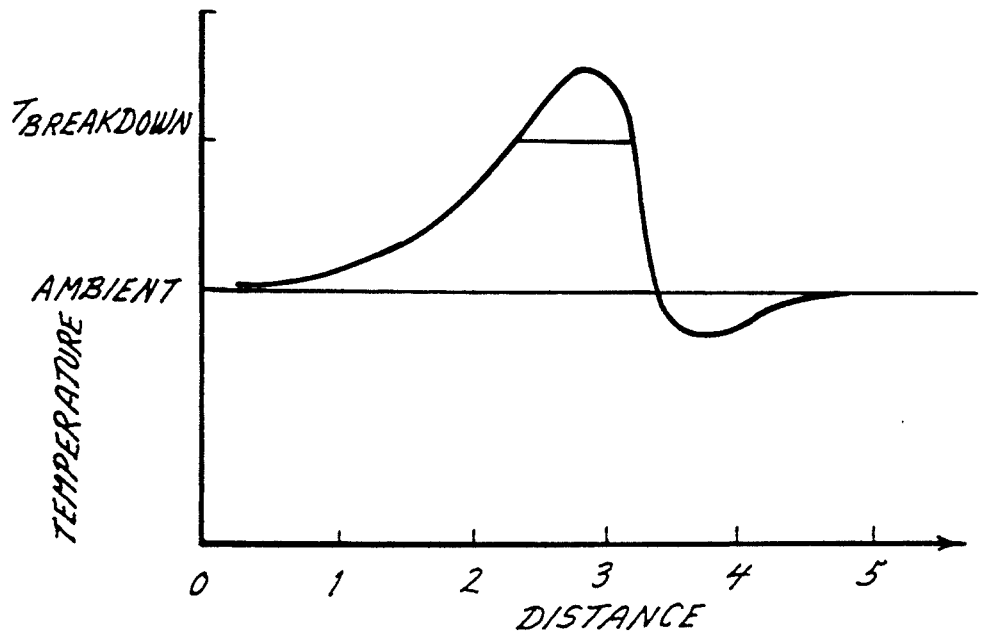
FIG. 4 is a graph showing a qualitative temperature profile along a path on the structure resulting from irradiating a target area of the structure with the light source and cooling the target area with a particle stream.

Referring now to FIGS. 1 and 4, collectively, at position "0" with reference to distance (the units are arbitrary) along the length of structure 22, well in advance of the thermal influence of the light energy, the structure 22 is at ambient temperature. The temperature of the structure increases from ambient temperature towards the target area, as shown in FIG. 4, and reaches a maximum directly under optical energy source 14, as would be expected. As the temperature along the length of structure 22 subjected to the most radiation increases above a minimum "molecular breakdown temperature," $T_{breakdown}$, the material in layers 24 and 26 pyrolyzes, breaking down into smaller molecules. These smaller molecules have less adhesion to each other and to the substrate.

The pyrolyzation threshold temperature depends upon the particular materials comprising layers 24 and 26. As represented in FIG. 4, the layers 24 and 26 are pyrolyzed approximately between positions 2.3 and 3.20. The particle stream 30 is generally oriented so as to impinge the pyrolyzed portion before it cools below the molecular breakdown temperature as light source 16 scans forward to irradiate a new target area. As housing 12 continues to move in the direction of arrow 21, the temperature of structure 22 decreases rapidly because the previously irradiated portions of the structure are cooled by the particle stream 30. If the temperature of particle stream 30 is below ambient temperature, as would be the case if particle stream 30 were comprised of frozen carbon dioxide pellets entrained in air, the temperature in the vicinity of the region so impinged may actually decrease below ambient temperature. At about position "5" well behind the influence of either the light energy or the particle stream 30, the structure 22 is at ambient temperature.

EXAMPLE 1

To demonstrate the removal of materials from a substrate using the methods and system of present invention, an experiment was conducted to remove paint from a structure comprising a 0.08 cm thick aluminum substrate on which was formed an epoxy primer painted with a polyurethane topcoat. The results of the experiment were successful in that the primer and topcoat were removed without damaging the surface of the aluminum. The total thickness of the primer and topcoat varied from about 0.010-0.020 cm. The structure was irradiated with a xenon flashlamp from a distance of about 1.3 cm. The flashlamp had an arc length of 15.24 cm and an energy input of about 1200 joules (76 joules/cm), a repetition rate of 3 Hz and a FWHM pulse width of 1500 Ms. Energy was provided to the flashlamp by a single mesh pulse forming network power circuit having the following operating parameters: $C=700$ $\mu F$, $V=-1800$ V, and $L=965$ $\mu H$ (circuit inductance). The simmer current, I, that kept the flashlamp ionized, was 2 amps. The incident intensity of the output of the flashlamp at the surface of the structure was 3 joules/$cm^2$ and cast a 5.0 cm wide beam that scanned the surface of the structure at a rate of 0.08 cm/second. This scan rate and beam width, $W_L$, resulted in a material removal rate of 0.40 $cm^2$/second. The structure was blasted with frozen carbon dioxide pellets having a temperature of about $-109°$ F., at a mass flow rate of 11 kg/hr, entrained in dry air having a back pressure of 1700 KPa.

SECOND EMBODIMENT

The second embodiment also provides a benign process and system for removing coatings from a substrate without damaging the substrate. However, in addition to the system described with regard to the first embodiment, the second embodiment further features a digital data processor which coordinates and controls the scan rate of optical energy and particle stream 30 across the surface of structure 22. Control is effected using feedback provided by an optical detecting circuit that detects the optical character of the surface of the structure 22.

Figure 7:
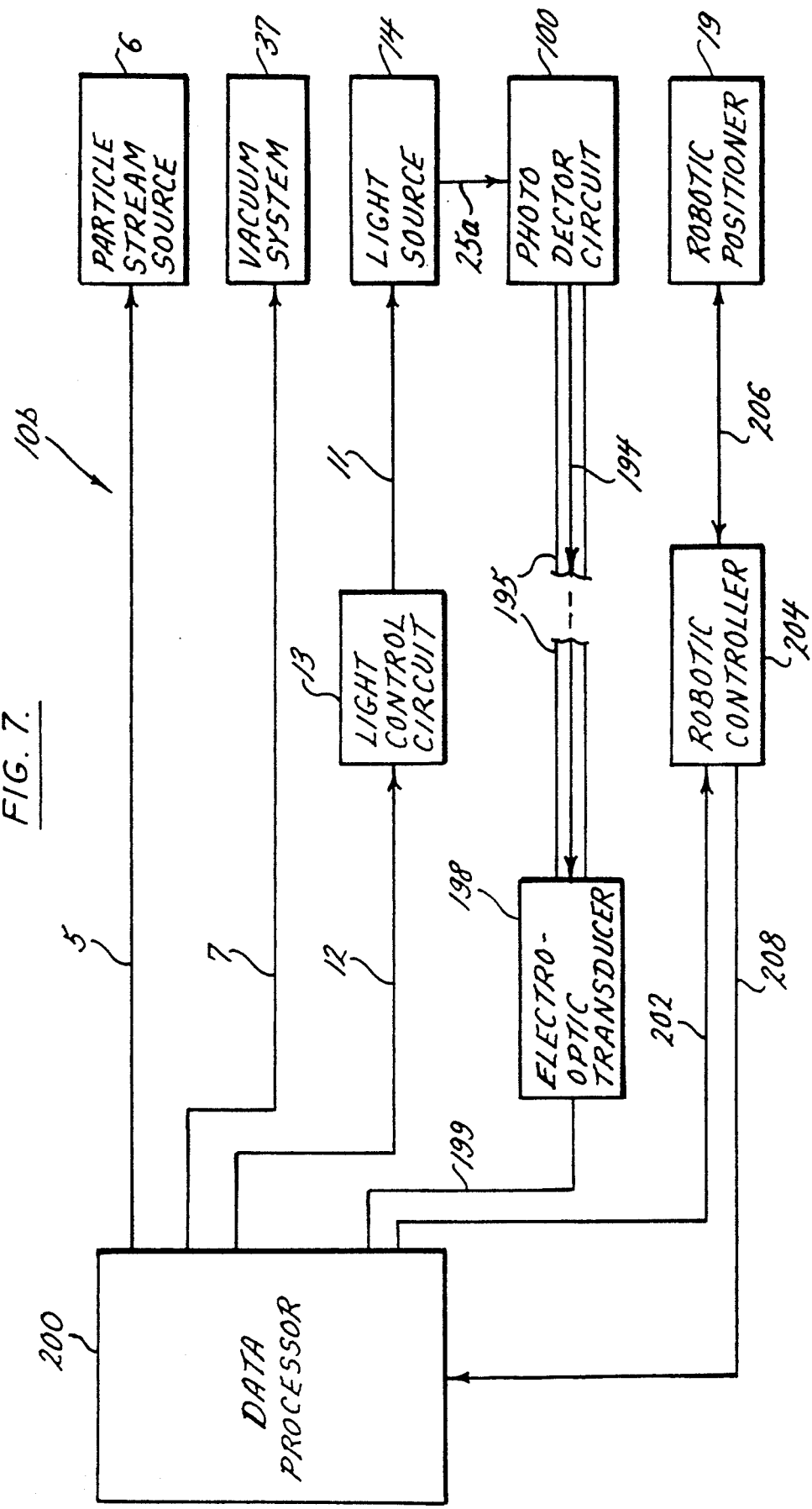
FIG. 7 is a block diagram of a second embodiment of a system embodying various features of the present invention which employs a photodetecting circuit that generates feedback used to control the removal of the coating.

Referring to FIG. 7, which is a block diagram of system 10b embodying features of the second embodiment, data processor 200 generates output signal 5 to enable particle stream source 6; output signal 7 to enable vacuum system 37; output control signal 12 to light control circuit 13 (which may be of a type well known by those skilled in the art); and output signal 202 which provides path and speed instructions to robotic controller 204. The data processor 200 may be, for example, an IBM AT or AT compatible personal computer. The light control circuit 13 generates a control signal 11 which establishes the repetition rate and pulse width of the output of optical energy source 14. The robotic controller 204, responsive to signal 202, generates control signals 206 that direct the path and speed of robotic positioner 19. Photodetecting circuit 100 detects the optical condition at the surface 98 of the structure 22 and generates optical feedback signals 194 that are conveyed by the optical fiber 195 to an electro-optic transducer 198. The transducer 198 transforms optical signals 194 into corresponding digital electronic signals 199 which are combined by data processor 200 into the composite output signal 202. The robotic controller 204 transforms the component (199) of composite signal 202 from the transducer 198 into instruction signal 206 that directs robotic positioner 19 to scan the radiant energy source 14 and the particle stream 30 across the surface 98 of the structure 22.

The path of robotic controller 204 is determined in accordance with a suitable path generating processing routine that is implemented by data processor 200 in accordance with techniques well known by those skilled in the art. The controller 204 provides a signal 208 to the data processor 200 of the position of the robot positioner.

Figure 8:
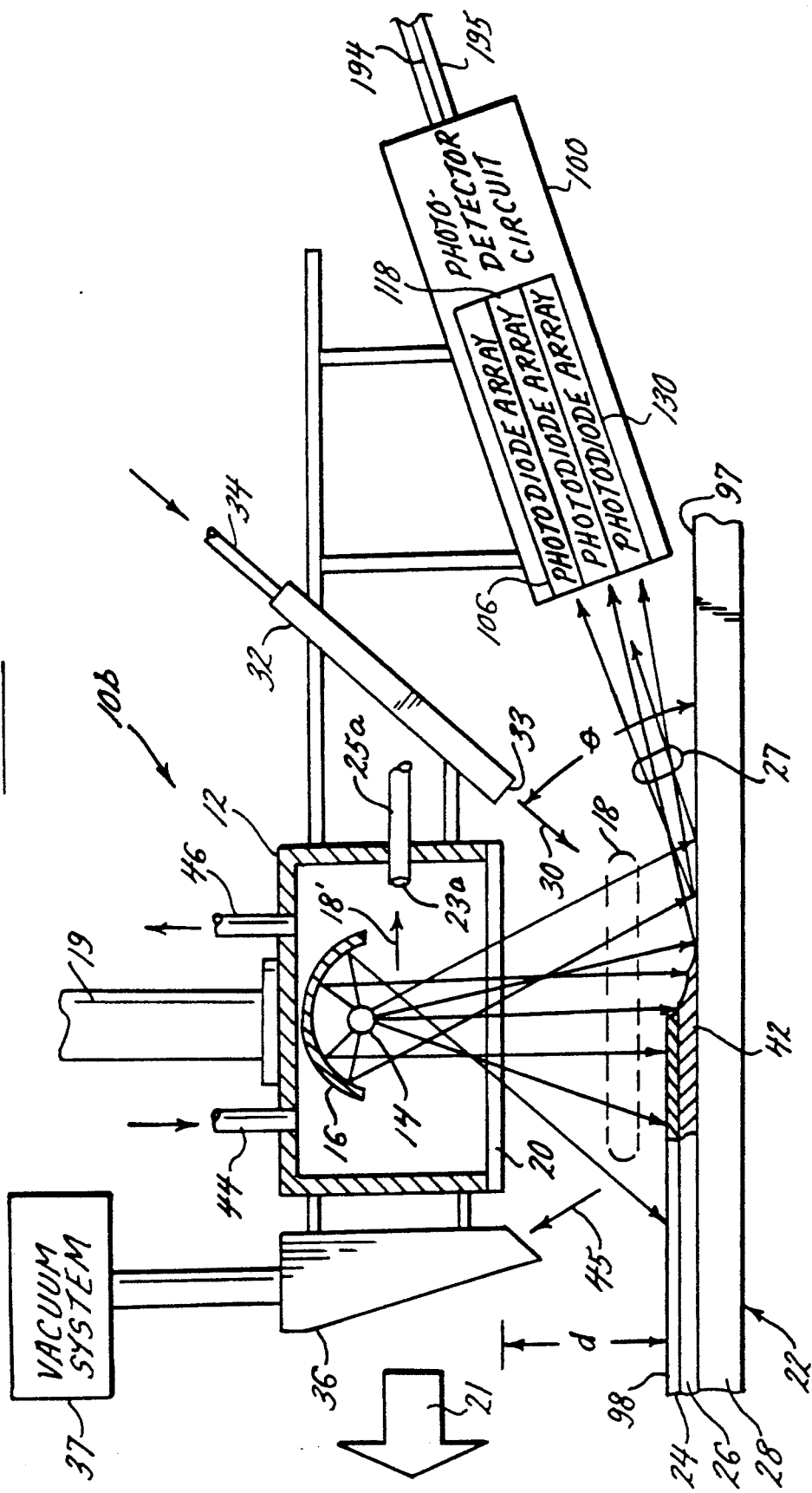
FIG. 8 is a diagram of an apparatus embodying various features of the present invention for removing a coating from a substrate by pyrolyzing and blasting the coating from the surface of the substrate which includes optical feed back to control the coating removal process.

Referring to FIG. 8, there is shown housing 12, optical energy source 14 and reflector 16, as described above with regard to the first embodiment and as shown in FIG. 1. Housing 12 is supported by robotic positioner 19 at a predetermined standoff distance from the surface of structure 22. The standoff distance is determined as described further herein. Robotic positioner 19 is controlled to move housing 12 along a predetermined path, at a controlled scan speed, over the surface 98 of the structure 22 so that optical energy source 14 and particle stream 30 may be directed to irradiate and impinge, respectively, the coating or coatings formed on the surface of the substrate 28. The robotic positioner 19 may be a CIMROC 4000 Robot Controller manufactured by CIMCORP Precision Systems, Inc., Shoreview, MN. The scan speed is related to the output signal 199 by a monotonic increasing function bounded by upper and lower limits, as described more fully below. The material 45 removed from the surface of substrate 28, and the expended particle stream 30, are collected by vacuum system 37 through nozzle 25 mounted to housing 12.

The particle stream 30 is provided by particle stream source 6 which may provide gas, liquid, or solid particles, or any combination of particles. For example, particle stream source 6 may be a gas tank if particle stream 30 is a gas, or a carbon dioxide pellet source of the type commercially available from Cold Jet, Inc., if the particles are frozen $CO_2$ pellets. The particles which comprise particle stream 30 are delivered to nozzle 32 via duct 34.

Figure 9:
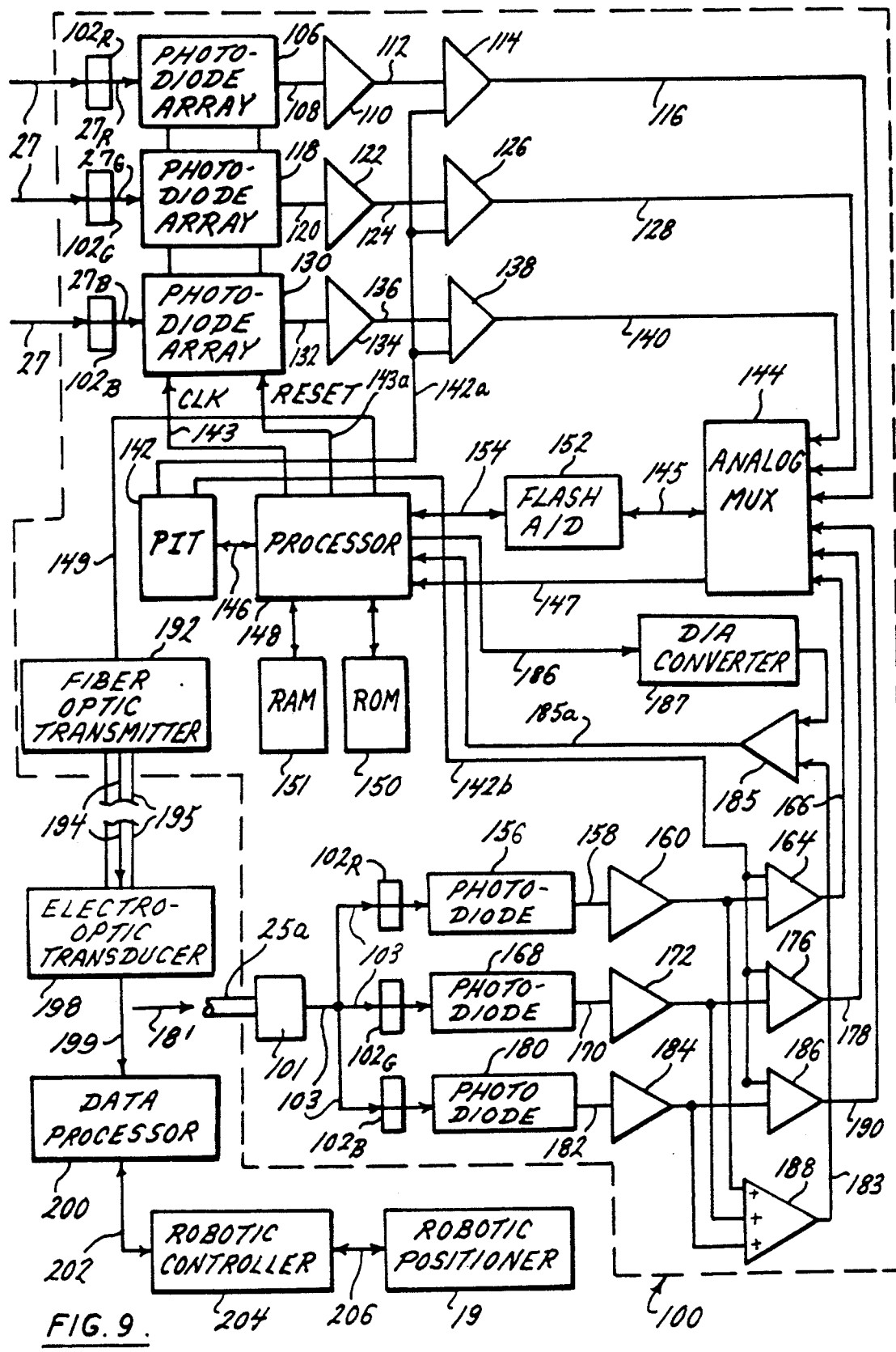
FIG. 9 is a block diagram of the photodetecting circuit.

Referring to FIGS. 8 and 9, photodetecting circuit 100 is mounted to housing 12 (by means not shown) and detects the optical character of the surface of structure 22 and generates an optical, digital weighted sum average value ("WSAV") output signal 194. The signal 194 is propagated via optical fiber 195 to the electro-optic transducer 198 which then converts signal 194 into digital electronic data signals 199. Converting the output of photodetecting circuit 100 to an optical signal reduces the effects of electromagnetic interference on the quality of the data received by data processor 200.

Referring to FIG. 8, photodiode circuit 100 is mounted to housing 12 such that reflected optical energy from the surface of structure 22 is received and filtered by filters $102_x$ and filtered into light signals $27_x$, where x represents a particular narrowband optical wavelength or color associated with such wavelength, such as red, green, and/or blue. A block diagram of an example of photodetector circuit 100 is shown in FIG. 9. The filtered light $27_x$ is provided to photodiode arrays 106, 116, and 130. Referring to FIG. 9, at the heart of photodetecting circuit 100 is a processor 148. Such processor 148 may be implemented using any suitable microprocessor circuit capable of operating at a modest clock speed, e.g., 5-10 MHz. By way of example, processor 148 may be implemented using an Intel 8X51FB imbedded processor. Coupled to the microprocessor 148 is a conventional random access memory (RAM) 151, a conventional read only memory (ROM) 150, an analog-to-digital (A/D) converter 152, and an analog multiplex circuit (MUX) 144. Each channel is designed to detect a particular characteristic wavelength, or band of characteristic wavelengths. For example, the channels may be respectively designed to receive and process wavelengths characteristic of the colors, red, blue and/or green. In this manner, photodetecting system 100 is able to receive and analyze optical energy from selected portions, or from all, of the entire optical portion of the electromagnetic spectrum.

The optical data received in each data channel is filtered by lenses $102_R$, $102_G$, and $102_B$ ("R" represents the color red; "G" represents the color green; and "B" represents the color blue) and is continuously monitored by photodiodes contained in the photodiode arrays 106, 118 or 130, respectively. Such optical data is temporarily stored in the photoarrays in response to receiving an appropriate reset signal $143b$ generated by processor 148. Each photodiode in the array, as explained more fully below, represents the light received from a defined area or "pixel" of the reflection footprint, i.e., the monitored area of structure 22 from which the reflected light 27 is received. The data temporarily held in the photodiode arrays is then serially transferred, under control of the processor 148, through appropriate channels, including the MUX 144 and the A/D 152, into the processor 148. The processor 148 processes the data in a prescribed manner. For example, the processor may divide the signals received in each data channel by a corresponding normalization signal obtained from a sample optical energy 18' of the light from source 14. As shown in FIGS. 8 and 9, sample optical signal 18' is provided to photodetecting circuit 100 through lens 23a and fiber optic bundle 25a which may penetrate housing 12 as shown in FIG. 8. Optical signal 18' may also be provided to photodetecting circuit 100 through a fused quartz tube, or light pipe, that penetrates housing 12 and is optically coupled to photodetector circuit 100 by an optical fiber bundle. Optical energy 18' is filtered by lenses $102_R$, $102_G$, and $102_B$ and provided to photodiode circuits 156, 168 and 180, respectively, and is used to normalize the amplitude of data stored in the photodiode arrays so that the results of the data processing are independent of variations in the output of optical energy source 14.

As seen in FIG. 9, each optical data channel includes an optical filter $102_x$ that attenuates all light except light having selected characteristic wavelengths that is received from the surface of structure 22. Preferably, the reflected light 27 is received from a location somewhat behind the area on structure 22 which is impinged by particle stream 30, i.e., area 99 of FIG. 6. Filters $102_x$ are available commercially from numerous vendors for any desired wavelengths. The light that passes through the filter $102_x$ is received and temporarily held in a photodiode array 106, 118, or 130. By way of example, the photodiode array may be a $1 \times n$ photodiode array, where n is a positive integer, as for example 1024. The photodiode array receives and transforms any light $27_x$ transmitted through filter $102_x$, into a series of electrical pulses 108 having amplitudes corresponding to the intensity of the received light, as controlled by an appropriate clock signal 143 generated by the processor 148. The rate of the clock signal 143 by way of example may range from 2-25 MHz. The electrical pulses 108, 120 and 132 are amplified and scaled by amplifiers 110, 122 or 134. Track-and-hold circuits 114, 126 or 138, receive signals 112, 124 or 136 and generate a DC analog signal 116, 128 or 140 that corresponds to the peak pulse amplitude of electrical pulse train 112, 124 or 136 in response to receiving a hold signal $142a$ from parallel interrupt timer (PIT) 142.

Analog signals 116, 128, and 140 are coupled through MUX 144 to flash A/D converter 152 over signal line 145. Control of MUX 144 is effected by signals 147 generated by processor 148. The A/D converter 152 thus generates a digital data stream 154 corresponding to the signals 116, 128, or 140 that is directed as an input signal to processor 148. Processor 148, operably coupled to RAM 151, stores the digitized optical data thus received in RAM 151. ROM 150 stores a suitable operating program that controls the operation of the processor 148.

Photodetecting circuit 100 also includes a plurality of reference light channels that each receive a sample optical energy 18' of the optical energy generated by optical energy source 14. Coupler 101 splits optical energy 18' into three equal signals 103. Each such channel reference includes a photodiode circuit, 156, 168 and 180, that receives optical energy 18'. Each sample channel further includes an appropriate optical filter $102_x$, $102_R$ (Red), $102_G$ (Green), or $102_B$ (Blue) that filters out all but a desired wavelength or band of wavelengths. The photodiode circuits 156, 168 and 180 function similar to the photodiode arrays 106, 118, and 130, transforming any light transmitted through the filter $102_R$, $102_G$, or $102_B$ into a series of electrical pulses having amplitudes corresponding to the intensity of the transmitted light. Electrical pulses 158, 170 or 182 are provided to amplifiers 160, 172 or 184 respectively. The resulting scaled and amplified pulse train is directed to track-and-hold circuits 164, 176 or 180 which generate DC analog output signals 166, 178, and 190 representing the peak pulse amplitude of the amplified pulse trains in response to receiving hold signal 142b from PIT 142. The signal thus generated for each sample channel is provided to MUX 144.

Signals 166, 178 or 190 are used to normalize the light detected through photodiode arrays 106, 118, and 130 so that variations in the intensity of optical energy source 14 do not affect the processing of signals 116, 128, and 140 into an appropriate output control signal 194.

As also seen in FIG. 9, a summing amplifier 181 sums the output of the respective sample channel amplifiers 160, 172 and 184. The resulting-summed output signal is directed over signal line 183 to one input of a threshold detector 185. The other input of the threshold detector 185 is a reference voltage that is generated by digital-to-analog (D/A) converter circuit 187 as a function of a digital reference signal 189 determined by the processor 148 and conveyed to D/A circuit 187 via signal line 186. The signal 189 is provided only during a sample window when the output of optical energy source 14 is between predetermined amplitudes. Hence, the threshold detector 185 receives the reference voltage that enables it to respond to the summed output signal 183 only during such sample window. If the summed output signal 183 exceeds the threshold reference voltage during the sample window, which only happens during predetermined intervals in the pulse period of optical energy source 14, then the output of the threshold detector 185 goes high and functions as an interrupt signal 185a to the processor 148 causing it to enter a data sample mode. The sample window may be determined experimentally so as to enhance distinguishing reflected light 27 from the optical energy generated by source 14.

In the data sample mode, the processor 148 serially receives optical data from the photodiode arrays 106, 118 and 130 through the optical input channels and stores such data in RAM 151. Such data results from incoming optical signal 27 which is filtered and then stored in the photodiode arrays upon receipt of a reset signal 143b generated by processor 148. Also during the data sample mode, sample optical data may be received from the photodiodes 156, 168 and 180 through the sample channels. Parallel interrupt timer (PIT) 142 controls the timing of the particular data streams which are read by processor 148 and stored in RAM 151 by hold signals 142a and 142b so that, for example, data originating from a first input channel including photodiode array 106 and photodiode 156, are read together. PIT 142 similarly controls when data is output from track-and-hold circuits 164, 176 and 188 upon receipt of hold signal 142b from processor 148. Hold signals 142a and 142b are generated in response to PIT 142 receiving a timing signal 146 from processor 142. Timing signal 146 is generated whenever a clock signal 143 is generated by the processor. Upon receipt of timing signal 146, PIT 142 performs a countdown to "zero". When PIT 142 reaches "zero", hold signals 142a and 142b are generated. Thus, processor 148 reads data from the second input channel that includes photodiode array 118 and photodiode 168, and from the third input channel, which includes photodiode array 130 and photodiode 180.

The processing routine stored in ROM 150 and implemented in processor 148 causes processor 148 to determine the quotients of: signal 140 divided by signal 190, signal 128 divided by signal 178, and signal 116 divided by signal 166, in order to normalize the outputs of the photodiode arrays for variations in the intensity of the output of optical energy source. Signals 166, 178, and 190 need be sampled only once every data sample cycle, e.g., once every 100 clock signals 143 if photodiode arrays 106, 118, and 130 each have for example 100 diodes. Such normalization allows photodetecting circuit 100 to evaluate the optical character of the surface of structure 22 should the output of light source 14 vary over time.

The processor 148 generates the output signal 194 and transmits such signal to the control processor 200. If needed, such signal can be converted to an optical signal using an appropriate conversion circuit in order to allow the transmission of the signal to be done optically over a fiber optic transmission cable, thereby rendering the signal much more immune to electromagnetic interference. If so converted, an appropriate optical receiver circuit is used at the other end of the transmission line in order to convert the signal back to an electrical signal suitable for use by the control processor 200. Fiber optic transmitters and receivers suitable for such purpose may be implemented using, e.g., a Litton Fiber Optics Transceiver, Model EO3675-2.

By way of example, signal 194 may represent a weighted sum average, "$WSAV_{color}$", as determined by processor 148 in accordance with the equations below, where "color" corresponds to the narrowband portion of reflected light 27 detected by a particular photodiode array:

$$WSAV_R = \frac{\sum_{i=1}^{m} \left( \frac{Signal116i}{Signal166} \right)}{m}$$

$$WSAV_G = \frac{\sum_{i=1}^{m} \left( \frac{Signal128i}{Signal178} \right)}{m} \quad (2)$$

$$WSAV_B = \frac{\sum_{i=1}^{m} \left( \frac{Signal140i}{Signal190} \right)}{m} \quad (3)$$

where i represents a particular photodiode in the photodiode arrays, m represents the number of photodiodes in photodiode arrays 106, 118, and 130, and "R" "G" and "B" represent the red, green, and blue portions, respectively, of signal 27 as detected by photodiode arrays 106, 118, and 130, respectively. Thus, the weighted sum average for each channel corresponds to the average intensity of a given set of light data detected by a particular photodiode array.

The value of the weighted sum average ("WSAV") from the optical channel detecting the information of interest may be used to determine an appropriate scan speed for optical energy source 14. For example, if photodiode array 106 detects optical energy from the red portion of the visible portion of the electromagnetic spectrum, and the optical characteristic desired to be detected from the surface of a structure, such as structure 22, is colored red, then the weighted sum average for the red channel is used to determine an the scan speed of the optical energy source 14, as described in greater detail further herein.

The electronic digital WSAV signal 149 is converted to an optical digital signal 194 by optic transducer 192, and this signal is propagated to a remote optic transducer 198 by optical fiber 195. The optic transducer 198 converts optical signal 194 into an electronic digital signal 199 which is received by data processor 200. Optic transducers 192 and 198, may for example, may be implemented as a Litton Fiber Optics Products Model EO3675-2. As noted above, converting the output of processor 148 from an electronic to an optical signal reduces the effect of electromagnetic radiation from affecting the quality of the data received by data processor 200.

The processor 200 uses the value of WSAV as encoded in signal 199 as an address to a look-up table stored in processor 200 having address cells that each contain scan speed values corresponding to the value of signal 199. The contents of an addressed cell are retrieved and transformed into suitable scan speed control output that comprises, in part, signal 202, provided by data processor 200 to robotic controller 204.

The data processor 200 provides a composite control signal 202 which also includes "path" control instructions. Thus, composite signal 202 provides both path and speed control instructions to robotic controller 204. The robotic controller 204 then generates command signals 206 that direct the operation of robotic positioner 19, which may be implemented as a CIMROC 4000 Robot Controller manufactured by CIMCORP Precision Systems, Inc., Shoreview, Minn. The robotic controller is typically included as part of a robotic system by vendors of commercial robotic positioners. The purpose of robotic positioner 19 is to scan the surface of structure 22 with optical energy provided by optical energy source 14 and particle stream 30 in a predetermined path at a scan speed dependent on the optical character of the surface of structure 22 as determined by photodetecting circuit 100. The scan speed is controlled so that substrate 28 of structure 22 does not absorb excessive optical energy which is transformed into heat.

The temperature gradient through structure 22 is controlled to prevent damaging substrate 28 while layers 24 and 26 are being removed to expose substrate 28. Such control is effected by determining an appropriate scan speed, standoff distance, and mass flow rate and temperature of particle stream 30. However, as stated above, the preferred method of controlling the temperatures to which structure 22 is subjected is to vary the standoff distance and scan speed before attempting to vary the mass flow rate and temperature of particle stream 30. The discussion which follows describes one way by which appropriate values for the scan speed and standoff distance may be determined.

Figure 10:
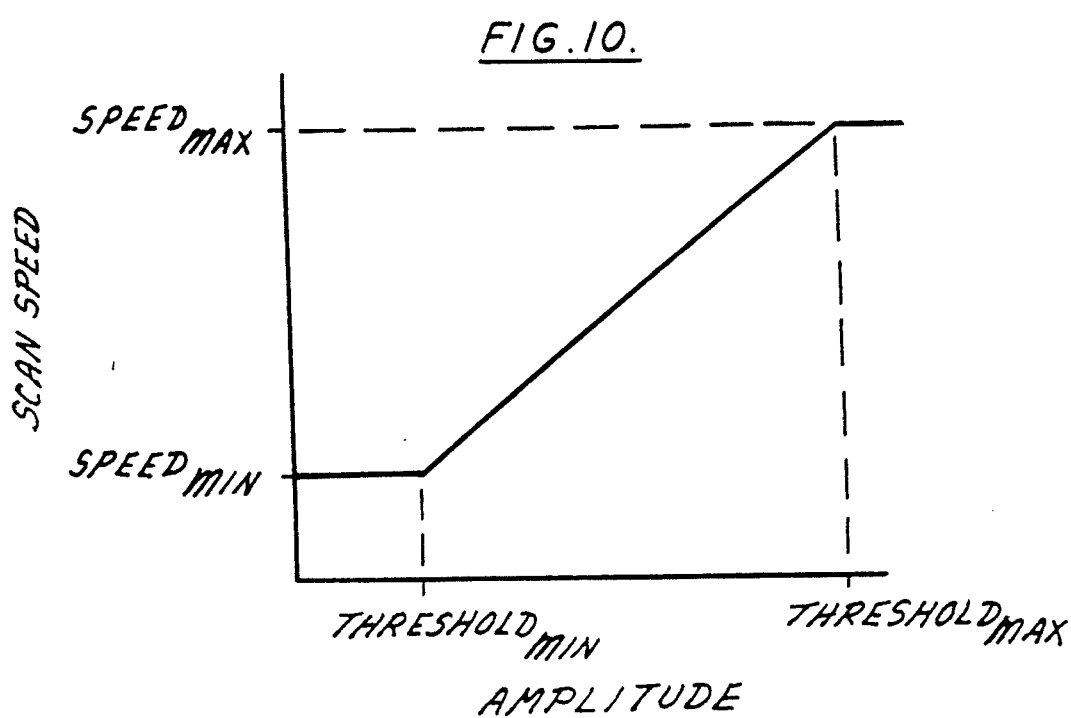
FIG. 10 is a graph showing the functional relation between the scan speed and the output of the photodetecting circuit.

As set forth above, the speed of robotic positioner 19 in relation to the weighted sum average value ("WSAV") determined by processor 148, and as represented by signals 149, 194 and 199, may be an increasing function which may be, by way of example only, linear with a positive slope between minimum and maximum speeds, as shown in FIG. 10. If the value of WSAV is equal to or less than a minimum threshold value, Threshold$_{min}$, then the speed of robotic positioner 19 is controlled to be a minimum scan speed, Scan Speed$_{min}$. If the value of WSAV is equal to or greater than a maximum threshold value, Threshold$_{max}$, then the speed of robotic positioner 19 is controlled to be the maximum scan speed, Scan Speed$_{max}$. If the value of WSAV is between the minimum and maximum threshold values, the scan speed is some value between the minimum and maximum scan speeds that satisfies the functional relation between scan speed and threshold value as described above.

The values for Threshold$_{min}$ and Threshold$_{max}$ are determined empirically as described below. A number of tests are conducted on test samples representative of structure 22, or on the structure 22 itself (both hereinafter referred to as the "test samples") using the system described above with reference to FIGS. 7 and 8. The test samples are scanned by optical energy source 14 and particle stream 30, at a predetermined standoff distance (as for example, 4.0 cm), at different speeds to determine appropriate minimum and maximum speeds for robotic positioner 19. The values of signals 149, 194, or 199, hence WSAV, are recorded for each test and are later used for reference. An operator then examines each of the test samples and determines which ones have acceptable finishes based on criteria described in greater detail further herein.

The minimum threshold value, Threshold$_{min}$, is determined by first identifying the test sample having the most material removed from structure 22, but still having an acceptable surface finish, as determined by appropriate acceptance criteria, such as the character of spectral reflections from the surface of the sample, as well as the intensity of such reflections. The value of the WSAV associated with that test sample is selected to be Threshold$_{min}$.

The maximum threshold value, Threshold$_{max}$ is determined by identifying the test sample having the least amount of material removed, but still having an acceptable finish. Again, this determination is based on appropriate acceptance criteria, as described above. The value of the WSAV associated with this particular test sample is selected to be Threshold$_{max}$.

The maximum scan speed, Scan Speed$_{max}$, is derived from the scan speed of robotic positioner 19 used when generating the data associated with Threshold$_{max}$. The Scan Speed$_{max}$ is established at a rate somewhat less than the actual scan speed associated with Threshold$_{max}$ in order to provide for a margin of error. For example, if the maximum observed scan rate is 2.0 cm/second and a safety factor of 10 per cent is desired, the maximum scan rate would be established at 1.8 cm/second.

The higher the scan speed, the lower the energy being applied to the structure because the output of optical energy source 14 is traveling relatively fast over the surface of structure 22, resulting in less optical energy being applied per unit area. The maximum scan speed of robotic positioner 19 is limited to assure that sufficient material is removed from the structure 22.

The minimum scan speed, Scan Speed$_{min}$, is derived from the scan speed of robotic positioner 19 used when generating the data associated with Threshold$_{min}$. The minimum scan speed is preferably established at a rate somewhat greater than the actual scan speed associated with Threshold$_{min}$ in order to provide for a margin of error. For example, if the minimum acceptable scan rate is 1.0 cm/second and a safety factor of 10 per cent is desired, the minimum scan rate would be established at 1.1 cm/second. The lower the scan speed, the greater the energy being applied to the structure, which may subject substrate 28 to higher, and potentially damaging temperatures. The minimum scan speed of robotic positioner 19 is controlled to prevent damage to the substrate.

Figure 11A:
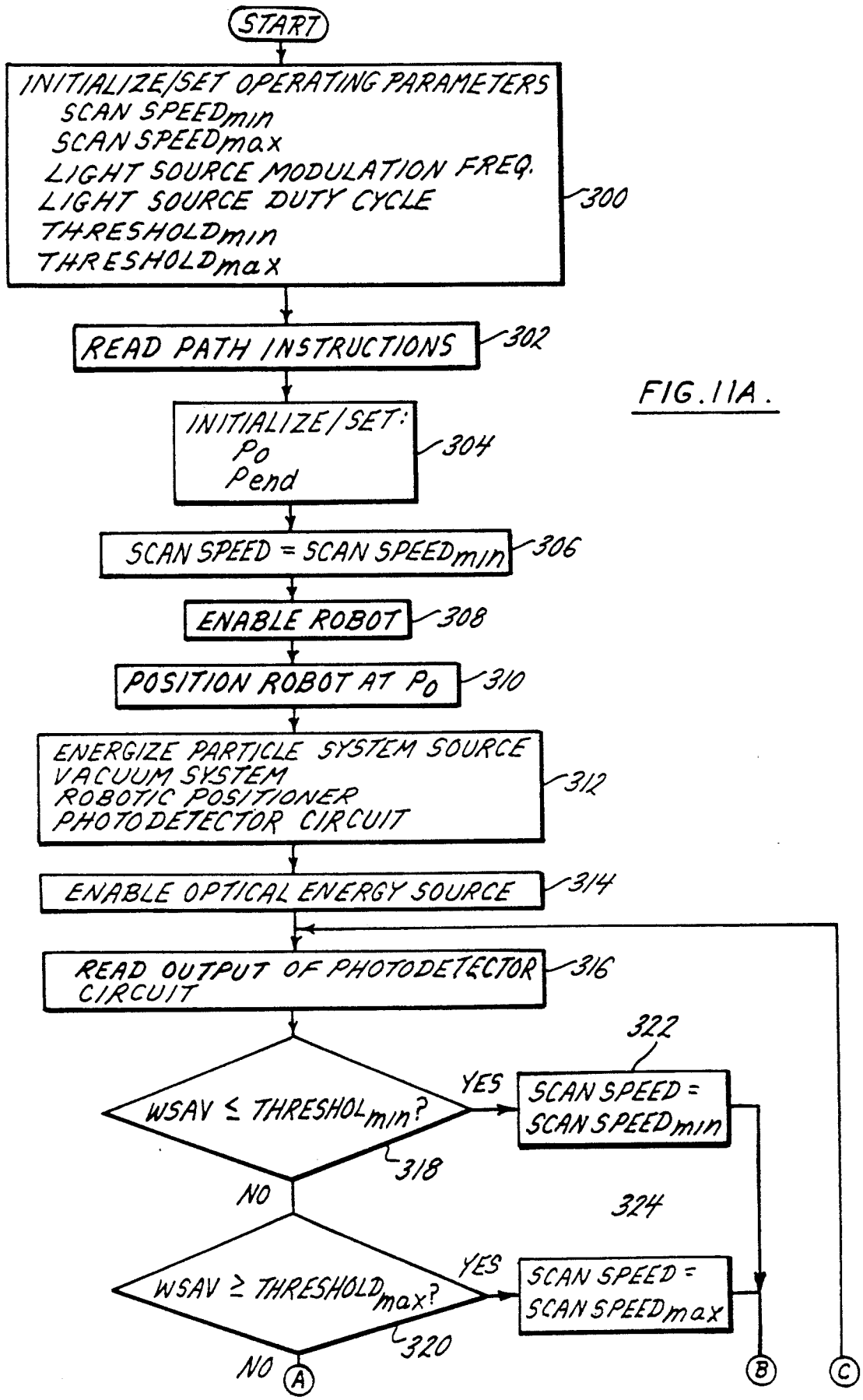
FIGS. 11A and 11B are a flow chart illustrating an example of one process by which the second embodiment may be implemented.
Figure 11B:
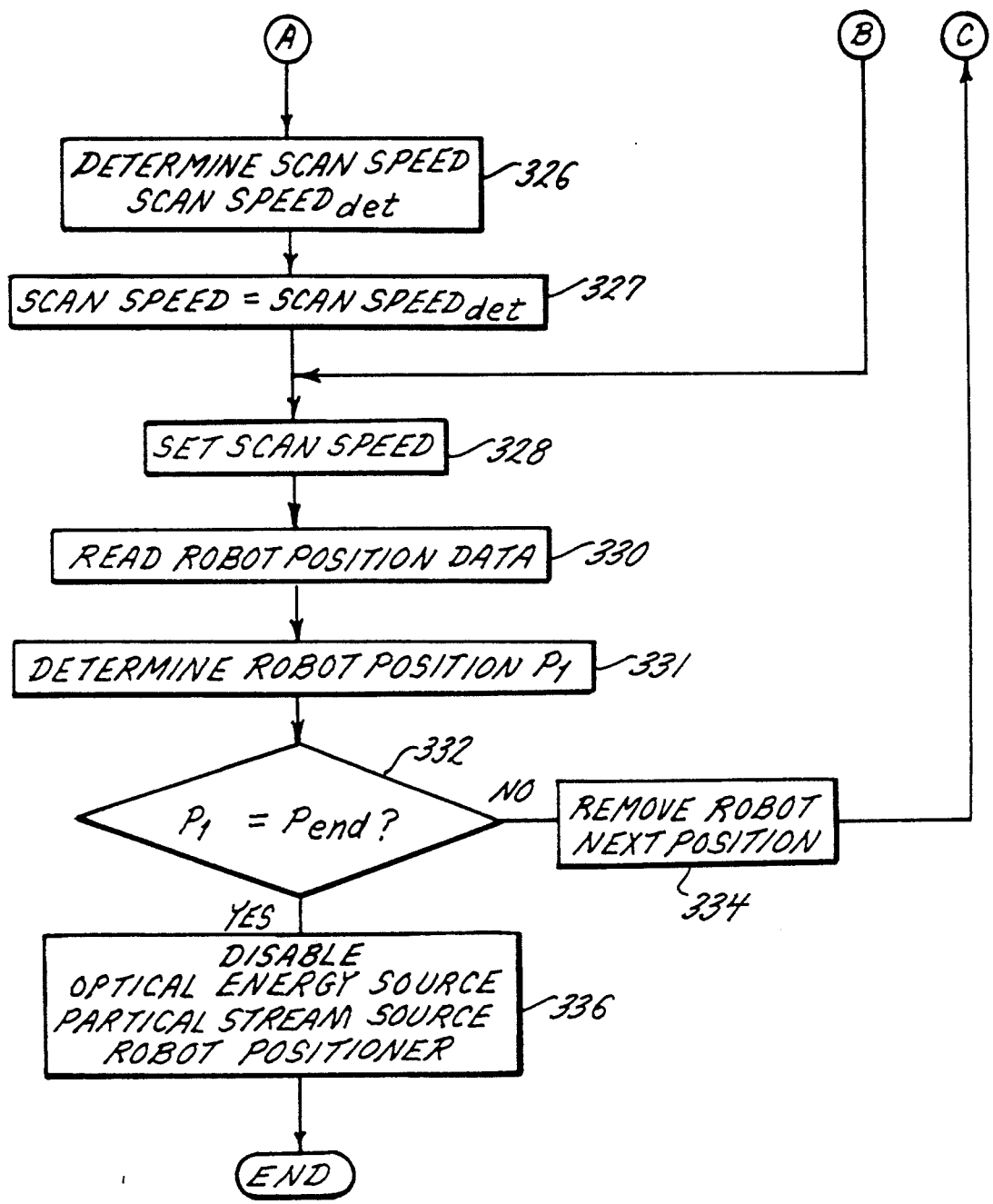

The operation of the method and system of the second embodiment may be more fully appreciated with reference to the flowchart presented in FIGS. 11A and 11B, collectively, and the following discussion. The steps associated with such flowchart may be readily incorporated into a suitable control program used by data processor 200 and robotic controller 204, or equivalent control apparatus. The operating parameters for the minimum and maximum scan speeds of robotic positioner 19 (Scan Speed$_{min}$ and Scan Speed$_{max}$, respectively), Threshold $_{min}$, and Threshold$_{max}$, as well as the repetition rate and pulse width of the output of optical energy source 14 are initialized in data processor 200 at step 300. Path instructions are input into and read by data processor 200 at step 302 in accordance with techniques well known by those skilled in the art. The path instructions define the predetermined path of robotic positioner 19. Then, based on the path instructions, values corresponding to the initial position, P$_o$, and the end position, P$_{end}$, of robotic positioner 19 along the path are set at step 304. Next, an initial value for the scan speed of robotic positioner 19 is set equal to the minimum scan speed, Scan Speed$_{min}$ at step 306. Robotic positioner 19 is enabled at step 308 and moved to its initial position, P$_o$ at step 310. At step 312, vacuum system 37, particle stream source 6, photodetecting circuit 100, and robotic positioner 19 are enabled. Optical energy source 14 is enabled at step 314. At this stage, the system is operational.

The surface characteristics of structure 22 are detected by photodetecting circuit 100 as previously described which generates output signal 194 representative of such surface characteristics. Signal 194 is converted into digital electrical signal 199 which is read by data processor 200 at step 316 and analyzed as described below.

At step 318, data processor 200 determines if the value of signal 199 (WSAV) is equal to or less than the minimum threshold value, Threshold$_{min}$. If that determination is YES, then the process proceeds to step 322 where data processor 200 defines the value for the variable scan speed, Scan Speed, to be equal to the minimum scan speed, Scan Speed$_{min}$. If the determination at step 318 is NO, then data processor 200 determines if the value of signal 199 is equal to or greater than the maximum threshold value, Threshold$_{max}$. If the determination at step 320 is YES, data processor 200 defines the scan speed to be equal to the maximum scan speed, Scan Speed$_{max}$. If the determination at step 320 is NO, then data processor 200 determines the scan speed at step 326, as previously described herein, and then sets the variable corresponding to the scan speed equal to the determined scan speed at step 327. Next, data processor 200 provides a scan speed control output signal 202 to robotic controller 204 at step 328 which directs robotic positioner 19 to move at the appropriate scan speed.

Then, data processor 200 reads data representative of the position of robotic positioner 19 at step 330 in accordance with techniques well known by those skilled in this art, and determines the position of robotic positioner 19 at step 331. Such position data may be provided by robotic controller 204 to data processor 200 by signal line 208.

After the position of robotic positioner 19 has been determined, a decision is made at step 332 as to whether the present position, P$_1$, of robotic positioner 19 along the predetermined path is the position, P$_{end}$, at the end of the predetermined path, previously defined by the path instructions at step 302. If the determination at step 332 is YES, then the processing of structure 22 is complete. Then, at step 336, data processor 200 provides appropriate output signals to disable particle stream source 6, robotic controller 204 and robotic positioner 19, vacuum system 37, and optical energy source 14. However, if the determination at step 332 is NO, then structure 22 has not been completely processed. In such case, the process returns to step 316 and continues as described above.

THIRD EMBODIMENT

Figure 12:
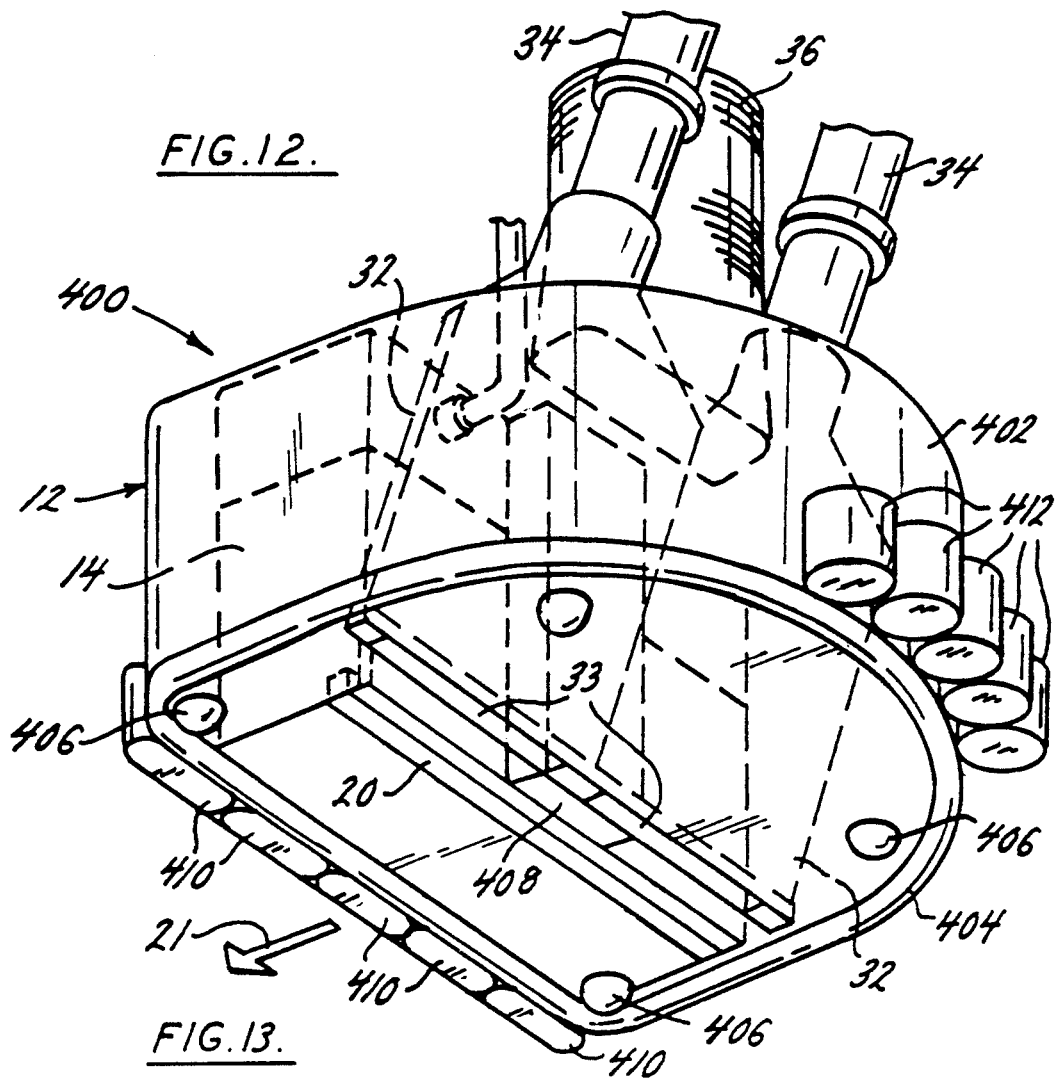
FIG. 12 is a schematic diagram of a third embodiment of a system embodying various features of the present invention.

A third embodiment of this invention is illustrated in FIG. 12. FIG. 12 shows a system 400, which comprises a housing 12, radiant energy source 14, preferably in the form of a flashlamp, a particle stream source, and a vacuum collection means 37, all as described above with respect to the first and second embodiments. However, as shown in FIG. 12, in the third embodiment the housing 12 is preferably mounted in an enclosure 402. The lower edge of the enclosure 402 has a seal 404 so that when the enclosure is positioned over the surface 98 of a structure 22, the enclosure 402 encloses a volume above the surface of the structure. There are rollers 406 mounted on the enclosure to facilitate rolling the enclosure over the surface of the coating. This volume facilitates the capture of material 45 removed from the structure 22 as well as the expended particles from particle stream 30. Furthermore, the enclosure helps reduce the escape of light from the flashlamp to the surrounding areas.

Figure 13:
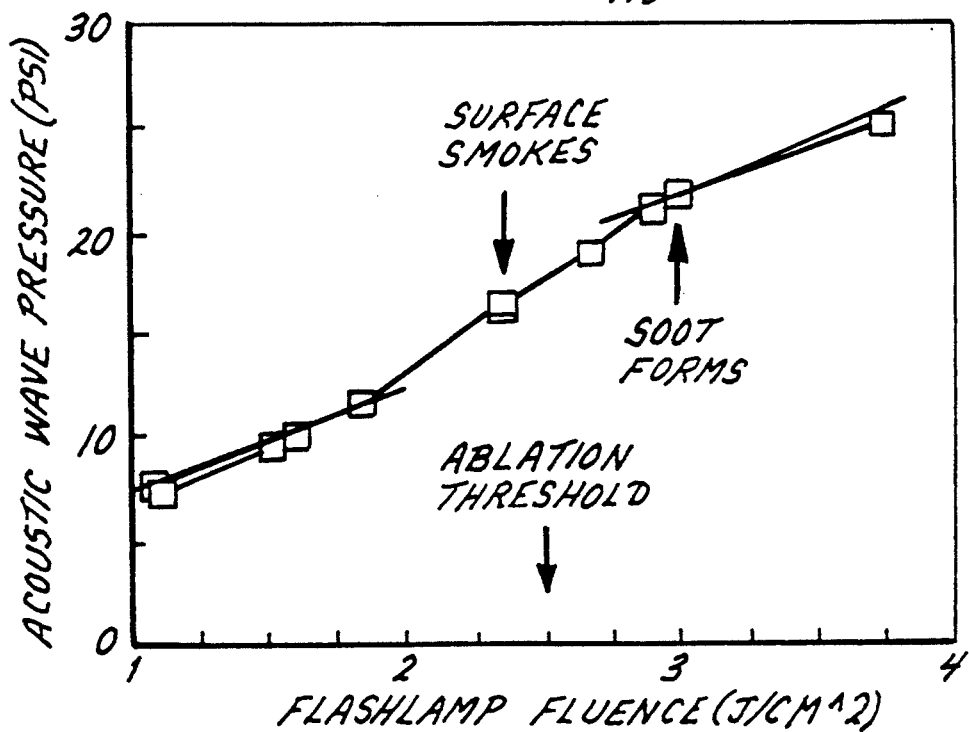
FIG. 13 is a graph of acoustic energy generated in the vicinity of the application of radiant energy, versus flashlamp fluency for a 464 $\mu$sec FWHM flashlamp pulse.

The system 400 may be provided with various sensors for facilitating the control of the device. For example, an acoustic sensor 408 can be provided inside the enclosure 402. The acoustic sensor 408 can monitor the acoustic wave generated by the rapid heating of the material. The rapid heating of the material caused by flashlamp 48 generates an acoustic wave. This acoustic wave differs as the depth of heating penetrates between two different layers of material (e.g., between the layers 24 and 26), and as the depth of the heating reaches the substrate. Thus monitoring the acoustic wave generated while applying radiant energy to the material can provide information on the depth of heating, i.e., when the depth of heating crosses a boundary between two layers of material or reaches the substrate. Moreover, monitoring acoustic energy can also detect when the material being irradiated has reached the ablation threshold. As illustrated in FIG. 13, the acoustic wave generated increases linearly with increasing flashlamp fluence, until the ablation threshold is reached. At the ablation threshold, there is a discontinuity. The increasing magnitude of the acoustic wave with increasing fluence, and the discontinuity allow the acoustic wave to provide feedback to control the application of energy to the structure, for example to control the flashlamp and/or the scan rate of the housing.

In particular, control means can be provided to control the scan rate of the housing so that the flashlamp provides sufficient energy to a given portion of the material to cause substantial pyrolyzation without substantial ablation, as determined by acoustic sensor 408. As the ablation threshold is reached or exceeded, as determined by acoustic sensor 408, the controller increases the scan speed, but if the material is not being substantially pyrolyzed, as determined by the acoustic sensor, the controller decreases the scan speed.

Other sensors can be provided for controlling the process. Lead sensors can be provided that can identify the substrate, and detect the type of coating and its thickness. Specifically, a row of eddy current sensors 410 can be provided along the lead side of the enclosure 402 to provide scanning capability across the width of the enclosure. These eddy current sensors may be Model No. SPO-4974 eddy current probes manufactured by the Nortec division of Stavely Company. These probes have a one-inch diameter, and are popularly called "pencil probes." As is known in the art, the lead sensors can determine the thickness of the coating thus providing the information required to establish the pulse duration and/or scan rate of the housing. The sensors are preferably driven by, and provide feedback data to, eddy current scopes which provide a visual display and a hard copy record, if desired. Alternatively, a microprocessor controller can process the inputs from the eddy current sensors to determine the optimum scan rate for optimum coating removal rate, for example by using the data from the probes to "look up" the appropriate scan speed from an empirically determined table stored in RAM or ROM in a microprocessor. Such a table could be generated by experiments correlating the effectiveness of removal of a particular type of coating on a particular type of substrate, with parameters such as pulse width, pulse rate, stand off distance, and scan rate of the energy source, and the particle type, mass flow rate, and pressure of the particle stream.

Trailing sensors can be provided to verify coating removal and to inspect the substrate for defects. Specifically, a row of eddy current sensors 412 can be provided on the trailing side of the housing. These may be the same type of sensors used for the leading sensors. As is known in the art, these trailing sensors can determine the thickness of any coating remaining on the substrate, and determine the condition of the substrate. It is often desirable to strip only the upper layers, and leave the primer on the substrate. The trailing sensors can also determine the structural integrity both on bare metal substrates, and on substrates on which a primer coating has been left. Data pertaining to the structural integrity of the substrate can be compiled and stored to provide a map of the substrate for future reference in servicing the substrate. For example the data can be used to pinpoint portions of the substrate that need repair. This simultaneous removal and inspection for defects is particularly useful for aircraft, since many times the primary purpose of decoating the plane is to perform inspections on the substrate. Output from the trailing sensors 412 can be used to control the scan rate to achieve the desired depth of material removal. If the sensors 412 determine that too much material is being removed, the controller can increase the scan speed. If the sensors 412 determine that not enough material is being removed, the controller can decrease the scan speed.

In addition to controlling scan speed based on the output of the sensors, it should also be understood that the particle stream could also be controlled, either instead of, or in addition to controlling the scan speed. For example of the sensors determined that the coating removal was less than desired, the flow rate or pressure of the particle stream might be increased accordingly, while if the sensors determined that the coating removal was greater than desired, the flow rate or pressure of the particle stream might be decreased. Furthermore, if the sensors determined that the temperature of the coating was too high, the flow rate of the particle stream might be increased to increase the cooling of the coating due to the particle stream.

While the present invention has been described in terms of preferred embodiments, it is to be understood that the invention is not to be limited to the exact form of the apparatus or processes disclosed. For example, the invention has been described where the light source and nozzle, together, scan a stationary structure with the optical energy and a particle stream. However, it is to be understood that the light source and particle may be stationary while the structure is displaced. Scanning the structure with optical energy and a particle stream may be effected by displacement of the structure as a result of translation, rotation, or a combination of both. Therefore, it is to be understood that the invention may be practiced other than as specifically described without departing from the scope of the claims.

We claim:

1. A method of removing material from a structure having a substrate covered with at least one layer of material, the method comprising the steps of:
    irradiating a portion of the material with radiant energy to heat the material sufficiently to break molecular bonds in the material and impinging the structure with a particle stream of frozen gas particles sufficiently close to the irradiating step to cool the substrate, maintaining the substrate at a temperature substantially below the temperature of the heated material, the particle stream also acting to remove the heated material from the substrate.

2. A method for removing material from a structure, comprising the steps of:
    (1) irradiating a target area of a structure having at least one layer of material formed on a substrate with radiant energy having an intensity sufficient to pyrolyze the material, weakening the chemical bonds in the material and between the material and the substrate; and
    (2) impinging said pyrolyzed material with particle stream having a temperature below ambient temperature in order to prevent overheating of the substrate to remove said pyrolyzed material from said structure.

3. The method of claim 2 wherein the step of irradiating includes irradiating said structure without permanently changing the modulus of elasticity, shear strength, and tensile strength of said substrate.

4. The method of claim 3 wherein the step of irradiating said structure includes generating said radiant energy with a flashlamp to produce optical energy.

5. The method of claim 4 further including the step of scanning said optical energy and said particle stream over said structure at a scan speed.

6. The method of claim 5 wherein the step of generating radiant energy includes generating said optical energy at a periodic repetition rate and pulse width.

7. The method of claim 6 wherein the step of irradiating includes irradiating said structure with said optical energy at an incidence intensity ranging up to about 30 joules/cm$^2$.

8. The method of claim 7 further including the step of controlling the temperatures of said material and said substrate by varying the distance between said surface and said flashlamp.

9. The method of claim 8 further including the step of controlling the temperature of said material and said substrate by varying said scan speed.

10. The method of claim 9 further including the step of controlling the temperatures of said material and said substrate by controlling the mass flow rate of said particle stream.

11. The method of claim 10 wherein the step of impinging includes impinging said structure with a stream of gas.

12. The method of claim 11 wherein the step of impinging includes impinging said structure with a stream of inert gas.

13. The method of claim 11 wherein the step of impinging includes impinging said structure with air.

14. The method of claim 10 wherein the step of impinging includes impinging said structure with a stream of liquid.

15. The method of claim 14 wherein the step of impinging includes impinging said structure with water.

16. The method of claim 10 wherein the step of impinging includes impinging said structure with a stream of solid particles entrained in a gas.

17. The method of claim 16 wherein the step of impinging includes impinging said structure with carbon dioxide pellets.

18. The method of claim 10 further including the step of scanning said surface of said structure with a vacuum system to collect said removed particles.

19. A method for removing material from a structure comprising the steps of:
   (1) irradiating a target area on the surface of a structure having at least one layer of material formed on a substrate with radiant energy having an intensity sufficient to pyrolyze the material, weakening chemical bonds in the material and between the material and the substrate without permanently changing the modules of elasticity, shear strength, and tensile strength of said substrate;
   (2) impinging said pyrolyzed material with a particle stream having a temperature below ambient temperature in order to prevent overheating of the substrate to remove said pyrolyzed material from said structure;
   (3) collecting said removed pyrolyzed material; and
   (4) scanning said radiant energy and said particle stream over said structure to advance the target area to remove said material along a path on said structure.

20. The method of claim 19 wherein the step of irradiating said structure includes generating said radiant energy with a flashlamp to produce optical energy.

21. The method of claim 20 wherein the step of generating said optical energy includes generating optical energy at a periodic repetition rate.

22. The method of claim 21 wherein the step of impinging includes impinging the pyrolyzed material in said target area with said particle stream while said target area is being irradiated by said optical energy.

23. The method of claim 21 wherein the step of impinging includes impinging said pyrolyzed material with said particle stream after said target area has been irradiated with said optical energy.

24. The method according to claim 1 wherein the particle stream maintains the temperature of the substrate sufficiently low to prevent permanent changes in the modulus of elasticity, shear strength, and tensile strength of the substrate.

25. The method according to claim 1 wherein the particle stream comprises a stream of frozen $CO_2$ particles.

26. The method according to claim 1 wherein the step of irradiating a portion of the material includes generating the radiant energy with a flashlamp to produce optical energy.

27. The method according to claim 26 further including the step of scanning said optical energy and said particle stream over said structure at a scan speed.

28. The method according to claim 27 wherein the step of generating radiant energy includes generating the optical energy at a periodic repetition rate and pulse width.

29. The method according to claim 1 wherein the step of irradiating includes irradiating the material with optical energy at an incidence intensity ranging up to about 30 joules/cm$^2$.

30. The method according to claim 1 further including the step of controlling the temperatures of the material and the substrate by controlling the mass flow rate of the particle stream.

31. The method according to claim 1 wherein the step of impinging includes impinging the structure with frozen carbon dioxide pellets.

32. The method according to claim 1 further including the step of scanning the surface of the structure with a vacuum system to collect material removed from the substrate.

33. The method according to claim 1 wherein the step of impinging includes impinging the heated material with the particle stream while the material is being irradiated.

34. The method according to claim 1 wherein the step of impinging includes impinging the heated material with the particle stream after the material has been irradiated.

35. The method according to claim 1 wherein the radiant energy is light.

36. The method according to claim 35 wherein the light is pulsed.

37. The method according to claim 36 wherein the pulsed light is generated with a flashlamp.

38. The method according to claim 1 wherein the particles comprise frozen particles of at least one gas selected from the group consisting of Ne, Ar, and $CO_2$.

39. A method for removing material form a structure comprising the steps of:
   (1) irradiating a target area on the surface of a structure having at least one layer of material formed on a substrate with radiant energy having an intensity sufficient to pyrolyze said material, weakening chemical bonds in the material and between said material and said substrate;
   (2) impinging said pyrolyzed material with a particle stream having a temperature below ambient temperature in order to prevent overheating of the substrate to remove said pyrolyzed material from said substrate;
   (3) scanning said surface of said structure with said radiant energy and said particle stream along a predetermined path at a scan speed;
   (4) detecting the optical character of said surface of said structure along said scanned surface of said structure and generating an electronic output signal corresponding to said optical character;
   (5) determining an updated scan speed functionally related to said electronic output signal;
   (6) directing said scan speed to be equal to said updated scan speed; and (7) repeating steps (1)–(6) if said radiant energy and said particle stream have not scanned the entirety of said predetermined path.

40. The method of claim 39 including the step of relating said updated scan speed to said electronic output signal by a monotonic increasing function, where said scan speed is a minimum scan speed if said electronic output signal is equal to or less than a first threshold value, and said scan speed is a maximum scan speed if said electronic output signal is equal to or greater than a second threshold value.

41. The method of claim 40 wherein the step of irradiating includes irradiating said structure without changing the modulus of elasticity, shear strength, and tensile strength of said substrate.

42. The method of claim 41 wherein the step of irradiating said structure includes generating said radiant energy with a flashlamp to produce optical energy.

43. The method of claim 42 wherein the step of generating radiant energy includes generating said optical energy at a periodic repetition rate.

44. The method of claim 43 wherein the step of irradiating includes irradiating said structure with said optical energy at an incidence intensity ranging up to about 30 joules/cm$^2$.

45. The method of claim 44 further including the step of scanning said surface of said structure with a vacuum system to collect said removed particles and said particle stream after said particle stream impinges said structure.

46. A method of removing material from a structure having a substrate covered with at least one layer of material, the method comprising the steps of:
irradiating a portion of the material with radiant energy sufficient to substantially pyrolyze that portion of the material without substantially ablating the material from the substrate;
impinging the pyrolyzed portion of the material with a particle stream having a temperature below ambient temperature in order to prevent overheating of the substrate to remove the pyrolyzed material before the material has had time to recover.

47. The method according to claim 46 wherein the radiant energy is light.

48. The method according to claim 47 wherein the light is pulsed.

49. The method according to claim 48 wherein the pulsed light is generated with a flashlamp.

50. The method according to claim 46 wherein the particle stream comprises frozen particles of substances that are gaseous at normal atmospheric temperatures.

51. The method according to claim 46 wherein the particles comprise frozen particles of at least one gas selected from the group consisting of He, Ne, Ar, and $CO_2$.

52. The method according to claim 46 wherein the particle stream comprises frozen particles of $CO_2$.

53. The method according to claim 46 wherein the step of irradiating a portion of the material comprises irradiating a target area on the material and successively advancing the target area along a path on the structure.

54. A method of removing material from a structure having a substrate covered by at least one layer of material, the method comprising the steps of:
applying pulsed light to a portion of the material sufficient to substantially pyrolyze the portion of the material without substantially ablating the material from the substrate;
impinging the pyrolyzed portion of the material with a particle stream having a temperature below ambient temperature in order to prevent overheating of the structure to remove the pyrolyzed material before the material has had time to recover.

55. The method according to claim 54 wherein the pulsed light is applied with a flashlamp.

56. The method according to claim 54 wherein the particle stream comprises frozen particles of $CO_2$.

57. A method for removing material from a structure having at least one layer of material formed on a substrate, the method comprising the steps of:
providing a source of pulsed light;
scanning the light source at a selected scan speed along a path on the structure to apply pulsed light to successively advancing target areas in the path to substantially pyrolyze the material in the target area without substantially ablating the material from the substrate; and
impinging the pyrolyzed material in the path with a particle stream having a temperature below ambient temperature in order to prevent overheating of the structure to remove the pyrolyzed material from the path.

58. The method according to claim 57 further comprising the step of monitoring the completeness of the material removal from the path, and adjusting the scan speed based upon the monitoring.

59. The method according to claim 58 wherein the step of monitoring the completeness of the material removed comprises measuring an electrical property of the substrate in the path, and adjusting the scan speed according to the measured electrical property.

60. The method according to claim 57 wherein the particle stream is directed to impinge a footprint on the structure that overlaps at least a portion of the current target area of the light source.

61. The method according to claim 57 wherein the particle stream is directed to impinge a footprint on the structure adjacent to, but not overlapping the target area of the light source.

* * * * *

UNITED STATES PATENT AND TRADEMARK OFFICE
CERTIFICATE OF CORRECTION

PATENT NO. : 5,328,517
DATED : July 12, 1994
INVENTOR(S) : Michael C. Cates, et al.

It is certified that error appears in the above-indentified patent and that said Letters Patent is hereby corrected as shown below:

On the title page, item [75] Inventors, add:

John D. Hoogerwerf,
      San Diego, CA

Signed and Sealed this

Eleventh Day of October, 1994

Attest:

BRUCE LEHMAN

*Attesting Officer*      *Commissioner of Patents and Trademarks*